US010006225B2

(12) United States Patent
Muchna et al.

(10) Patent No.: US 10,006,225 B2
(45) Date of Patent: Jun. 26, 2018

(54) SECURE 3D PRINTER AND 3D PRINTER MANAGEMENT NETWORK

(71) Applicant: Y Soft Corporation, Prague (CZ)

(72) Inventors: Vaclav Muchna, Prague (CZ); Ondrej Krajicek, Brno (CZ); David Miklas, Prague (CZ); Vladimir Coufal, Vamberk (CZ)

(73) Assignee: Y Soft Corporation, a.s., Prague (CZ)

( * ) Notice: Subject to any disclaimer, the term of this patent is extended or adjusted under 35 U.S.C. 154(b) by 0 days. days.

(21) Appl. No.: 15/419,532

(22) Filed: Jan. 30, 2017

(65) Prior Publication Data

US 2017/0218660 A1 Aug. 3, 2017

Related U.S. Application Data

(60) Provisional application No. 62/288,980, filed on Jan. 29, 2016.

(51) Int. Cl.
*E05B 47/02* (2006.01)
*E05B 47/00* (2006.01)
(Continued)

(52) U.S. Cl.
CPC ........ *E05B 47/026* (2013.01); *E05B 47/0002* (2013.01); *E05B 47/0046* (2013.01);
(Continued)

(58) Field of Classification Search
CPC .... G06F 3/1225; G06F 3/1236; G06F 3/1292; G06F 17/50; G06F 21/31; H04N 1/4426; H04N 1/4433
(Continued)

(56) References Cited

U.S. PATENT DOCUMENTS

| 5,752,697 A | 5/1998 | Mandel et al. |
| 8,264,709 B2 | 9/2012 | Okajima et al. |

(Continued)

FOREIGN PATENT DOCUMENTS

| CN | 204658978 U | 9/2015 |
| CN | 205086360 U | 3/2016 |

(Continued)

OTHER PUBLICATIONS

PCT Application No. PCT/IB2017/000130 International Search Report dated Jun. 19, 2017.
(Continued)

*Primary Examiner* — Negussie Worku
(74) *Attorney, Agent, or Firm* — White & Case LLP

(57) ABSTRACT

A printer management system includes one or more printing devices having a printing area for printing according to a digital file, an access area through which a user may access the printing area, and a locking mechanism configured to lock the access area preventing access to the printing area. A management server is communicatively coupled to the one or more printing devices over a communication network and is configured to receive a print request from one or more user devices or one of the one or more printing devices to print the digital file, transmit the digital file to one of the one or more printing devices, and transmit commands to lock and unlock the locking mechanism of the one or more printing devices. In one embodiment the management system is configured to update a printing status of each of the one or more printing devices.

32 Claims, 27 Drawing Sheets

(51) Int. Cl.
*E05B 49/00* (2006.01)
*E05B 65/00* (2006.01)
*E05B 73/00* (2006.01)
*G06F 21/31* (2013.01)
*G06K 19/10* (2006.01)
*G07C 9/00* (2006.01)
*H04N 1/44* (2006.01)
*G05B 19/042* (2006.01)

(52) U.S. Cl.
CPC ............ *E05B 49/00* (2013.01); *E05B 65/006* (2013.01); *E05B 73/0082* (2013.01); *G06F 21/31* (2013.01); *G06K 19/10* (2013.01); *G07C 9/00182* (2013.01); *G07C 9/00896* (2013.01); *H04N 1/4426* (2013.01); *H04N 1/4433* (2013.01); *E05B 2047/0054* (2013.01); *E05B 2047/0071* (2013.01); *E05B 2073/0088* (2013.01); *G05B 19/042* (2013.01)

(58) Field of Classification Search
USPC ................. 382/116; 482/8, 83; 705/3, 37; 358/1.15
See application file for complete search history.

(56) References Cited

U.S. PATENT DOCUMENTS

| | | | |
|---|---|---|---|
| 8,562,324 | B2 | 10/2013 | Pettis |
| 9,229,674 | B2 | 1/2016 | Tapley et al. |
| 9,248,611 | B2 | 2/2016 | Divine et al. |
| 9,430,169 | B2 | 8/2016 | Pettis |
| 2005/0017393 | A1 | 1/2005 | Stockwell et al. |
| 2011/0273860 | A1* | 11/2011 | Corvese ................... B41J 3/36 361/816 |
| 2014/0178588 | A1 | 6/2014 | Swanson et al. |
| 2014/0265046 | A1 | 9/2014 | Burris et al. |
| 2014/0288699 | A1 | 9/2014 | Williams et al. |
| 2015/0082372 | A1 | 3/2015 | Kottahachchi et al. |
| 2015/0165690 | A1* | 6/2015 | Tow ........................ B33Y 80/00 700/119 |
| 2015/0197064 | A1 | 7/2015 | Walker et al. |
| 2015/0258737 | A1* | 9/2015 | Dawson ................. G05B 15/02 700/119 |
| 2016/0068793 | A1* | 3/2016 | Maggiore ............ B29C 67/0085 435/289.1 |
| 2016/0191163 | A1* | 6/2016 | Preston ................. G01B 11/161 398/16 |
| 2017/0069154 | A1* | 3/2017 | Hilton ................. G07C 9/00182 |
| 2017/0103683 | A1* | 4/2017 | Yazdi .................... E05B 39/005 |
| 2017/0150004 | A1* | 5/2017 | Webb .................. H04N 1/32529 |
| 2017/0173889 | A1* | 6/2017 | Thomas-Lepore ..... G06F 21/31 |
| 2017/0198252 | A1* | 7/2017 | Mironov .................. C12N 5/00 |
| 2018/0035013 | A1* | 2/2018 | Share ..................... G06F 21/31 |

FOREIGN PATENT DOCUMENTS

| | | |
|---|---|---|
| CN | 205467392 U | 8/2016 |
| JP | 2015165394 A | 9/2015 |
| WO | 2014/118635 A2 | 8/2014 |
| WO | 2014/193311 A1 | 12/2014 |
| WO | 2015/022572 A2 | 2/2015 |
| WO | 2016/077326 A1 | 5/2016 |

OTHER PUBLICATIONS

PCT Application No. PCT/IB2017/000130 Written Opinion of the International Searching Authority dated Jun. 19, 2017.

* cited by examiner

FIG. 8D

SECURE 3D PRINTER AND 3D PRINTER MANAGEMENT NETWORK

CROSS REFERENCE TO RELATED APPLICATIONS

This applications claims priority to U.S. Provisional Application No. 62/288,980, filed Jan. 29, 2016, the contents of which are hereby incorporated by reference.

FIELD OF THE INVENTION

This invention generally relates to secure additive manufacturing, such as using 3D printers, and associated management networks.

BACKGROUND OF THE INVENTION 3D printing is an additive manufacturing process of making three dimensional solid objects from a digital file. One method for 3D printing is achieved by laying down successive layers of material until the three dimensional solid object is created. Each of these layers represents a thinly-sliced horizontal cross-section of the object. Other methods of 3D printing include selective laser sintering (SLS), selective laser melting (SLM), and stereolithography, among others. The 3D printing process begins by creating a virtual model of the object, typically a Computer Aided Design (CAD) file, and using specialized 3D printing software to "slice" the virtual model into hundreds or thousands of horizontal layers (depending on the desired fineness of the final printed object). The processed file with the sliced virtual model is then sent to a 3D printer that builds the model one layer at a time based on the individual slices of the virtual model.

Recent developments in 3D printing technology have reduced the cost and increased the availability of 3D printers and 3D printing software for the general public. However, such 3D printers and software generally remain limited to a single locally connected device for individual personal or professional use. There is, therefore, an unmet demand for a 3D printer management network that is secure, centrally managed, and accessible to individuals all around the world.

BRIEF DESCRIPTION OF THE INVENTION

In one embodiment, a printer management system includes one or more printing devices that have a printing area for printing according to a digital file, an access area through which a user may access the printing area, a locking mechanism configured to lock the access area preventing the user from accessing the printing area, and a management server communicatively coupled to each of the one or more printing devices over a communications network. The management server is configured to receive a print request from one or more user devices or one of the one or more printing devices to print the digital file, transmit the digital file to a selected one of the one or more printing devices, and transmit commands to lock and unlock the locking mechanism of the one or more printing devices.

In one embodiment, the one or more printing devices are configured to lock the locking mechanism during printing of the digital file, and unlock the locking mechanism upon receiving a command from the management server or from an authorized user or upon an authorized user manually unlocking the locking mechanism. In another embodiment, the management server is further configured to update a printing status of each of the one or more printing devices and the selected one or more printing devices is selected based upon the printing status of each of the one or more printing devices.

In one embodiment, the one or more printing devices further comprises a user interface. The user interface is configured to authenticate an authorized user, and unlock the locking mechanism in response to an unlock command from the authorized user.

In one embodiment, the locking mechanism comprises an electromagnetic lock. In another embodiment, the locking mechanism comprises a mechanical bolt-action lock.

In one embodiment, the management server is further configured to store a plurality of digital files, and the user interface is further configured to retrieve, in response to a request from the authorized user, a selected one or more digital files of the plurality of digital files for printing by the printing device.

In one embodiment, the user interface is further configured to transmit, in response to a print command from the authorized user, the print request to the management server. In another embodiment, the print request comprises the metadata for the digital file.

In one embodiment, the metadata comprises at least one of a file name of the digital file, an owner of the digital file, an estimated time to print the digital file, and an estimated amount of material required to print the digital file. In another embodiment, the printing status indicates printer operation time, printer occupation time, or printer material remaining.

In one embodiment, the one or more printing devices further comprises a moveable panel adapted to cover the access area when disposed in a closed position, and the locking mechanism is configured to lock the moveable panel in the closed position.

In one embodiment, a printer management system includes, a management server capable of being communicatively coupled to one or more printing devices over a communications network, The management server is configured to receive, over the communications network, a print request from one or more user devices or the one or more printing devices to print a digital file, transmit, over the communications network, the digital file to a selected one or more printing devices, and transmit, over the communications network, commands to lock and unlock a locking mechanism of the one or more printing devices. The locking mechanism is configured to secure an access area through which a user may access a printing area of the printing device for printing the digital file.

In one embodiment, the management server transmits the command to lock the locking mechanism of the selected one or more printing devices prior to printing of the digital file, and transmits the command to unlock the locking mechanism of the selected one or more printing devices at a time after the digital file has completed printing.

In one embodiment, the management server is further configured to update a printing status of each of the one or more printing devices. In another embodiment, the management server is further configured to store the digital files received from the one or more user devices. In one embodiment, the print request comprises the metadata for the digital file.

In one embodiment, metadata comprises at least one of a file name of the digital file, an owner of the digital file, an estimated time to print the digital file, and an estimated amount of material required to print the digital file. In another embodiment, the printing status indicates printer operation time, printer occupation time, or printer material remaining.

In one embodiment, a printing device includes a printing area for printing a digital file, an access area through which a user may access the printing area, and a locking mechanism configured to lock the access area preventing the user from accessing the printing area. The printing device is capable of being communicatively coupled to a management server, and the printing device is configured to lock the locking mechanism during printing of the digital file, and unlock the locking mechanism upon receiving a command from an authorized user or from the management server.

In one embodiment, the locking mechanism comprises an electromagnetic lock. In another embodiment, the locking mechanism comprises a mechanical bolt-action lock. In one embodiment, the printing device includes a user interface configured to authenticate an authorized user, and unlock the locking mechanism in response to an unlock command form the authorized user.

In one embodiment, the printing device also includes a moveable panel adapted to cover the access area when disposed in a closed position, wherein the locking mechanism is configured to lock the moveable panel in the closed position.

BRIEF DESCRIPTION OF THE FIGURES

FIGS. 8A-8K are screen images of the administrator interface of a management server of the additive printer management network of FIG. 1, according to one embodiment of the invention.

DETAILED DESCRIPTION OF THE INVENTION

Figure 1:
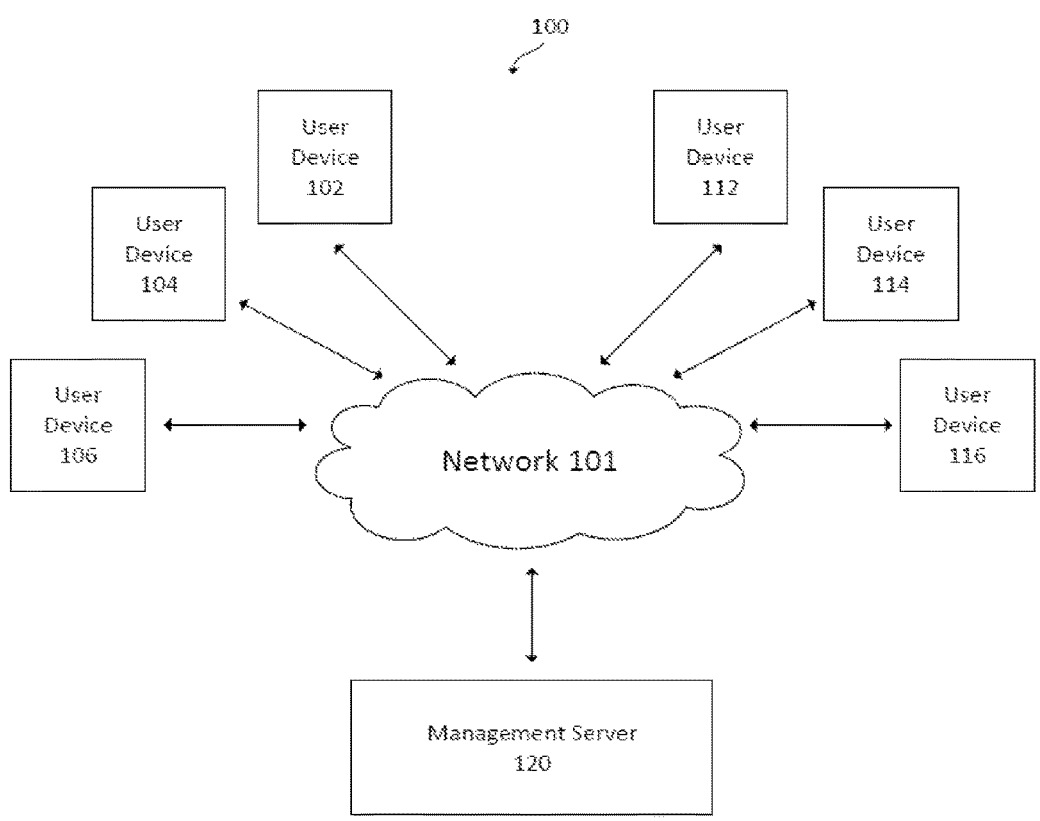
FIG. 1 is a block diagram of a 3D printer management network, according to one embodiment of the invention.

FIG. 1 is a block diagram of a 3D printer management network 100, according to one embodiment of the invention. As shown in FIG. 1, network 101 connects a plurality of user devices 102, 104, and 106, a management server 120, and a plurality of 3D printers 112, 114, and 116. In one embodiment, the management server 120 may be run on one or more of the 3D printers 112, 114, or 116 within the 3D printer management network 100. For illustrative purposes, FIG. 1 illustrates three 3D printers 112, 114, and 116 but many more could be implemented in the network 100. The network 101 may be any known communications network, including the Internet, a Local Area Network (LAN), a Wide Area Network (WAN), etc. User devices 102, 104, and 106 may comprise any suitable device for transmitting a request for 3D printing over the network 100. For example, user devices 102, 104, and 106 may comprise personal computers (PCs), laptops, smartphones, tablets, and the like. Management server 120 may also comprise any suitable device for managing the plurality of 3D printers 112, 114, and 116 over the network 101, including a PC, a laptop, a rackmount system mounted in a server cage, etc.

Because network 101 connects the plurality of user devices 102, 104, and 106, the management server 120, and the plurality of 3D printers 112, 114, and 116, the devices comprising the secure 3D printer network 100 may be distributed geographically as necessary. For example, in one embodiment, 3D printers 112, 114, and 116 may be located remotely from the management server 120, which in turn, is located remotely from the user devices 102, 104, and 106. Given the distributed nature of the 3D printer management network 100, in one embodiment, the communications between the plurality of user devices 102, 104, and 106, the plurality of 3D printers 112, 114, and 116, and the management server 120 over the network 101 are secured using any suitable technique. In various embodiments, the communications may be secured using public key cryptography such as RSA, Transport Layer Security (TLS), Secure Sockets Layer (SSL), or any combination or variant thereof.

While FIG. 1 shows three user devices 102, 104, and 106, and three 3D printers 112, 114, and 116, it should be understood that the 3D printer management network 100 is not limited to any specific number of user devices and 3D printers, and is scalable from a single user device and a single 3D printer, to hundreds or thousands, or more, of such devices. Additionally, central server 120 may comprise a single device, or in other embodiments, may comprise multiple devices centrally managing the plurality of 3D printers 112, 114, and 116.

Figure 2:
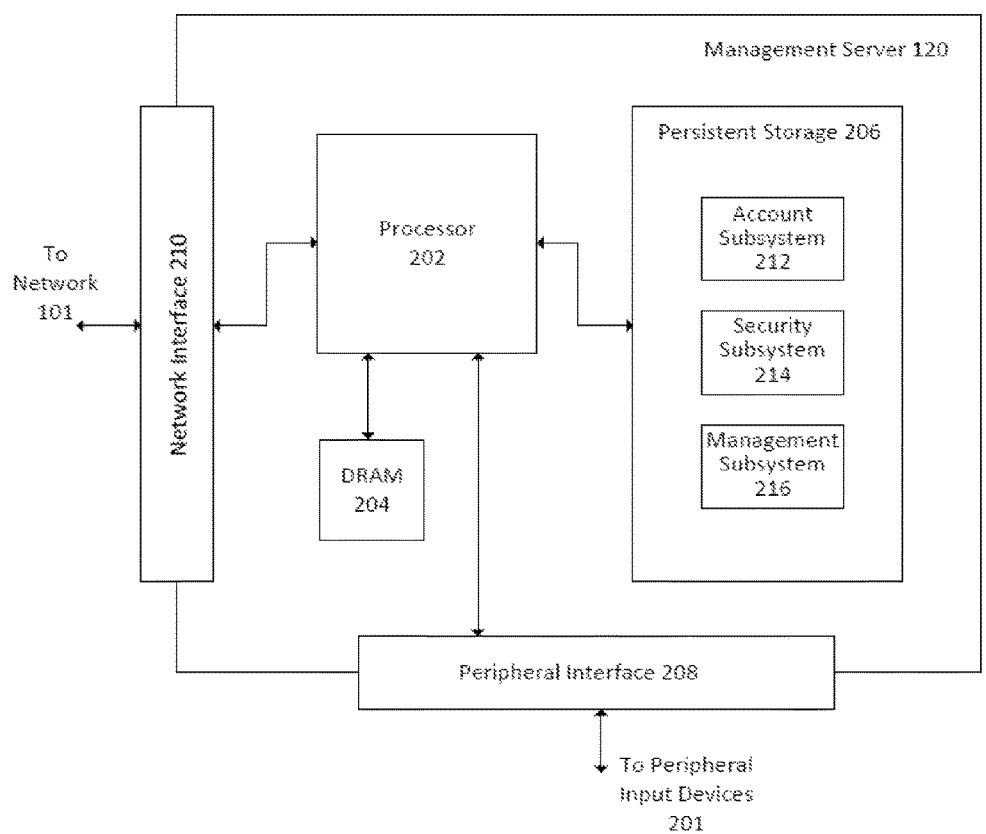
FIG. 2 is a block diagram of the structure of a management server of the 3D printer management network of FIG. 1, according to one embodiment of the invention.

FIG. 2 shows a block diagram of the structure of the management server 120 of the 3D printer management network 100 shown in FIG. 1, according to one embodiment of the invention. As shown in FIG. 2, the management server 120 comprises a processor 202 in communication with DRAM 204, persistent storage 206, peripheral interface 208, and network interface 210. In another embodiment, the persistent storage 206 need not be persistent, and may comprise volatile memory devices, or a combination of volatile and non-volatile memory devices. In yet a further embodiment, the persistent storage 206 and the DRAM 204 may be the same device.

Network interface 210 connects the management server 120 to the network 101. Peripheral interface 208 connects the management server 120 to peripheral input devices 201. Peripheral interface devices 201 may include a keyboard, a mouse, a touch panel, or any other suitable device to input user commands and control the management server 120. Alternatively, in one embodiment, control of the management server 120 is performed remotely over the network 101 through the network interface 210. Persistent storage 206 stores user account subsystem 212, security subsystem 214, and 3D printer management subsystem 216.

User account subsystem 212 stores individual user account information, including the user's 3D printing history, stored 3D printing files, available funds, and any pending 3D printing requests. In one embodiment, the individual user account information is stored remotely and the user account subsystem 212 is configured to access the remotely stored information by causing the processor 202 to retrieve the information through the network 101 via the network interface 210. In this embodiment, the individual user information may be stored in the cloud, in a network-attached storage (NAS) device, or any other suitable remote storage device. For enhanced security, in one embodiment, the individual user information is encrypted using any suitable method.

Security subsystem 214 stores user authentication information with respect to each individual's user information stored by the user account subsystem 212. The user authentication information may comprises a user's username and associated password, a user's identification and associated pin number, a user's card number, a user's RFID tag, a user's biometric data (such as a fingerprint image), or any other suitable identification information, or combination thereof, to verify the user is properly authorized to access the user information stored or accessible by the user account subsystem 212. In one embodiment, the user authentication information is stored remotely from the management server 120, and the security subsystem 214 is configured to access the remotely stored authentication information by causing the processor 202 to retrieve the information through the network 101 via the network interface 210. In this embodiment, the user authentication information may be stored in any suitable remote storage device. In one embodiment, the user authentication information is encrypted using any suitable method.

Additionally, security subsystem 214 stores administrator authentication information. Once authenticated, the security subsystem 214 is configured to allow the administrator to access all of the individual user account information stored or accessible by the user account subsystem 212. Once given access to the individual user account information, an administrator may view or modify the user account information. Additionally, in one embodiment, the security subsystem 214 is configured to allow the administrator to lock or unlock a user's account. For example, if a user has violated a rule or regulation imposed by an administrator, the administrator may lock the user's account to prevent the user from accessing the secure 3D printer network 100.

3D printer management subsystem 216 is configured to retrieve and make available real-time information regarding the status of the 3D printers 112, 114, and 116 of the secure 3D printer network 100 (shown in FIG. 1) to both the authorized users and the administrators. In one embodiment, the 3D printer management subsystem 216 is configured to either periodically or asynchronously fetch the status of each individual 3D printer 112, 114, and 116 to determine if a respective 3D printer 112, 114, and 116 is idle (available to receive and print a 3D printing file), is in progress (in the process of printing the 3D printing file), is completed (printing has been completed but the user has not retrieved the printed object), has encountered an error, or requires maintenance, among other statuses that may also be applicable to each of the 3D printers 112, 114, and 116.

Additional status information, such as the amount of printer material remaining (e.g., length of filament string), the estimated time remaining for the 3D printing to be completed, printer operation time (indicating total for the 3D printing to complete), total occupation time including print time and the amount of time the 3D printing has been finished (indicating the amount of time the object has been waiting to be picked up by the user), and the estimated amount of time before a user picks up the 3D printed object (can be an estimate based on the average pickup time, or an estimated pick up time provided by the user, for example) may also be provided to users and administrators.

In another embodiment, the plurality of 3D printers 112, 114, and 116 periodically transmit their current status over the network 101 to the management server 120, and the 3D printer management subsystem 216 is configured to cause the processor 202 to retrieve that information via the network interface 210 for use by the 3D printer management subsystem 216. In one embodiment, the real-time information regarding the status of the 3D printers 112, 114, and 116 of the secure 3D printer network 100 is stored in the DRAM 204.

In one embodiment, the management server 120 is configured to receive a 3D printing request to print a 3D printing file from a user device 102, 104, or 106, and associates the 3D printing request and 3D printing file with the user's account. After the 3D printing request and 3D printing file is received by the management server 120, the user may then access the 3D printing file from one of the 3D printers 112, 114, and 116 for printing by logging into their account and retrieving the 3D printing file from the management server 120.

In another embodiment, 3D printing files containing metadata for the 3D print job (i.e., the details of the print job, including the print job file name, the estimated amount of time to print, material consumption, owner of the print job, and a unique identifier that allows the management server 120 to associate user account information with a specific 3D print job) may be stored on and retrieved from any portable storage device connected to one of the 3D printers 112, 114, and 116. In this embodiment, the 3D printers 112, 114 and 16 are configured to retrieve and store the metadata for the 3D print job in a non-volatile memory (not shown) along with user account information and any status updates related to the print job. The 3D printers 112, 114 and 116 send the metadata for the 3D print job to the management server 120 when communication can be established with the management server 120 over network 101. Alternatively, the metadata may be separately transmitted to the management server 120 from a user device 102, 104, or 106 when communication can be established with the management server 120 over network 101.

In yet a further embodiment, 3D printing files may be generated by additional devices, such as 3D scanners or X-ray imagers, and the files may be transmitted to the management server 120, transmitted to a user device 102, 104, or 106, or retrieved using a portable storage device for 3D printing. Depending on the method of transmission and/or retrieval of the 3D printing files generated in this manner, either of the embodiments described above may be utilized to initiate a 3D printing request for the 3D printing file.

In another embodiment, the management server 120 is configured to receive a 3D printing request from a user device 102, 104, or 106 of an authorized user over the network 101, and directly transmit the 3D printing file specified by the user to a selected 3D printer 112, 114, and 116 of the secure 3D printer network 100. In one embodiment, the user may view the status of the 3D printers 112, 114, and 116, and select one or more of the 3D printers 112, 114, and 116 to print the 3D printing file. In another embodiment, the user may specify how many copies of the 3D printing file the user wants to print, and the management server 120 dynamically selects the 3D printers 112, 114, and 116 to transmit the 3D printing file to for printing. In this embodiment, the management server 120 may dynamically select the 3D printers 112, 114, and 116 based upon the real-time information regarding the status of each of the 3D printers 112, 114, and 116.

In one embodiment, the management server 120 is configured to allow an administrator to remotely take control of any 3D printer 112, 114, and 116 of the secure 3D printer network 100. An administrator may cancel any pending print job, whether in progress or awaiting printing, re-arrange pending print jobs, power up, shut down, or restart the 3D printers 112, 114, and 116, and lock or unlock 3D printers 112, 114, and 116 (discussed in further detail below in connection with FIG. 3).

Figure 3:
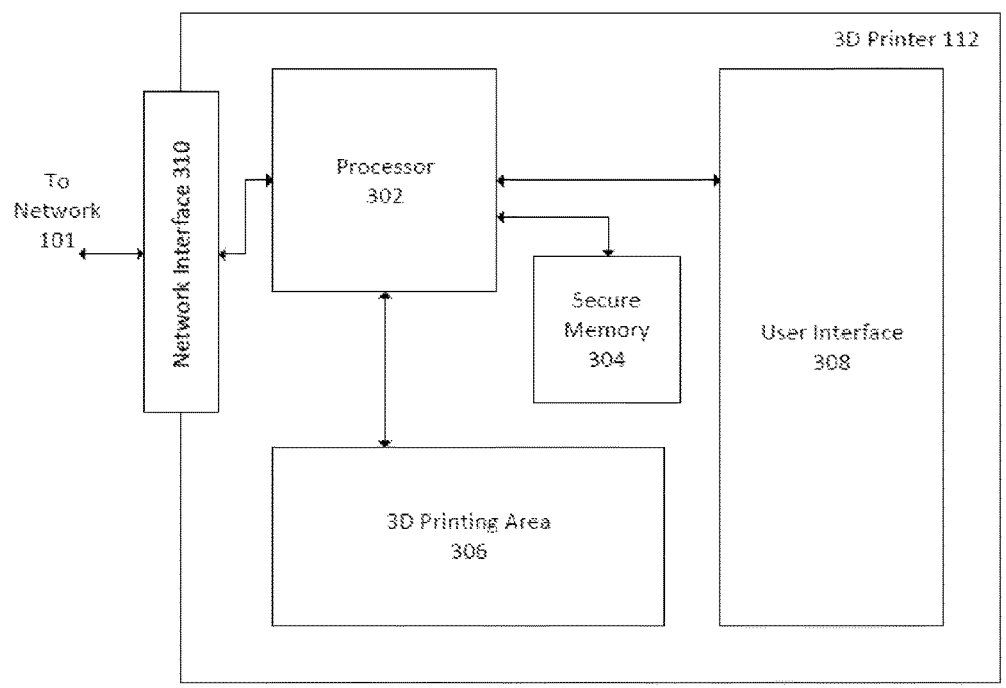
FIG. 3 is a block diagram of the structure of a 3D printer of the 3D printer management network of FIG. 1, according to one embodiment of the invention.

FIG. 3 is a block diagram of the structure of a 3D printer 112 of the 3D printer management network 100 of FIG. 1, according to one embodiment of the invention. As shown in FIG. 3, the 3D printer 112 comprises a processor 302 in communication with a secure memory 304, user interface 308, 3D printing area 306, and network interface 310. Network interface 310 connects the 3D printer 112 to the network 101. 3D printing files that are received over the network 101 via the network interface 310 are stored in the secure memory 304. Secure memory 304 may either be persistent or non-persistent memory, or both. Because the 3D printer 112 must be publicly accessible, secure memory 304 may be electronically or physically secured, or both, to protect the integrity and security of the user's 3D printing files. Electronic security for the secure memory 304 may comprise any suitable encryption techniques. Physical security for the secure memory 304 may comprise locking the secure memory 304 in a secure location within the 3D printer 112.

3D printing area 306 comprises the 3D printing structure of the 3D printer 112. 3D printing area 306 includes, for example, a print head (also known as an extruder) mounted to a plurality of motors that control the spatial movement of the print head in the x, y, and z axis, and a controller configured to control the motors and the print head to print the layers of a 3D printing file. 3D printing area 306 may comprise structures suitable for any known 3D printing process, including vat photopolymerisation, material jetting, binder jetting, material extrusion, powder bed fusion, sheet lamination, directed energy deposition, etc.

The 3D printing area 306 is secured using a locking mechanism to prevent unauthorized access to the 3D printing area 306. The locking mechanism may comprise any suitable locking device for securing the 3D printing area 306. In one embodiment, the locking mechanism comprises an electromagnetic lock. In another embodiment, the locking mechanism comprises a mechanical bolt action lock. The 3D printing area 306 may only be unlocked by the owner of the 3D printing file using his or her user authentication information, or by an administrator. The locking mechanism may also generate visual, audible and/or tactile alerts when an unauthorized user attempts to unlock or damage the lock.

User interface 308 provides an interface for a user or an administrator to control aspects of the individual 3D printer 112, or in various embodiments, aspects of the secure 3D printer network 100 may be accessed via the user interface 308. In one embodiment, the user interface 308 allows a user to enter his or her user authentication information to unlock the 3D printing area 306. Depending on the type of user authentication information required, the user interface 308 may include a card reader, an RFID scanner, a biometric scanner, etc. Additionally, in another embodiment, once the user provides valid authentication information to the user interface 308, the user may access the user account subsystem 212 of the management server 120 (shown in FIG. 2) over the network 101 to access his or her user information.

From the user interface 308, an authorized user may retrieve a 3D printing file associated with the user's account from the management server 120 for printing, view the user's print requests and print history, send stored 3D printing files to other users or groups of users, access 3D printing files shared with the user from another user, request a previously printed file to be sent to the 3D printer 112, or any other 3D printer 114 and 116 within the secure 3D printer network 100, for printing, view the user's account balance, add funds to the user's account, upload a new 3D printing file from a local storage device (such as a USB drive) for printing, etc. In one embodiment, an authorized user may also download a 3D printing file from a database of 3D printing files. In this embodiment, the database may be available for specific users. 3D printing files in the database may be filtered depending on, for example, the age of the users or the types of groups to which they belong. In one embodiment, users that contribute to the 3D printing files in the database may be compensated or rewarded, either in money, printing credit, or in any alternative method of remuneration, for their contribution to the database. In effect, the user interface 308 may be configured to provide the authorized user the same functionality as the user's devices 102, 104, or 106.

Similarly, in one embodiment, an administrator may use the user interface 308 to access user account subsystem 212, the security subsystem 214, and the 3D printer management subsystem 216 of the management server 120 via the network 101. In this manner, the administrator may effectively manage the secure 3D printer network 100 from 3D printer 112. For example, if an administrator notices that an error occurred during the printing of a 3D printing file, the administrator may use the user interface 308 to access the account subsystem 212 of the management server 120 and issue a refund to the account of the user that requested the printing.

In another embodiment, the user interface 308 may further include an option to request assistance from an administrator or an authorized staff member. In one embodiment, the user may request electronic assistance, whereby a communications link is opened to an administrator or an authorized staff member in order to provide assistance. In one embodiment, the user may request physical assistance, whereby an electronic or physical message (for example, a flashing light on the 3D printer 112) is transmitted to an administrator or an authorized staff member indicating that physical assistance is requested at the 3D printer 112. In one embodiment, the administrator and authorized staff members that are authorized to provide assistance can be configured on the management server 120.

Figure 4A:
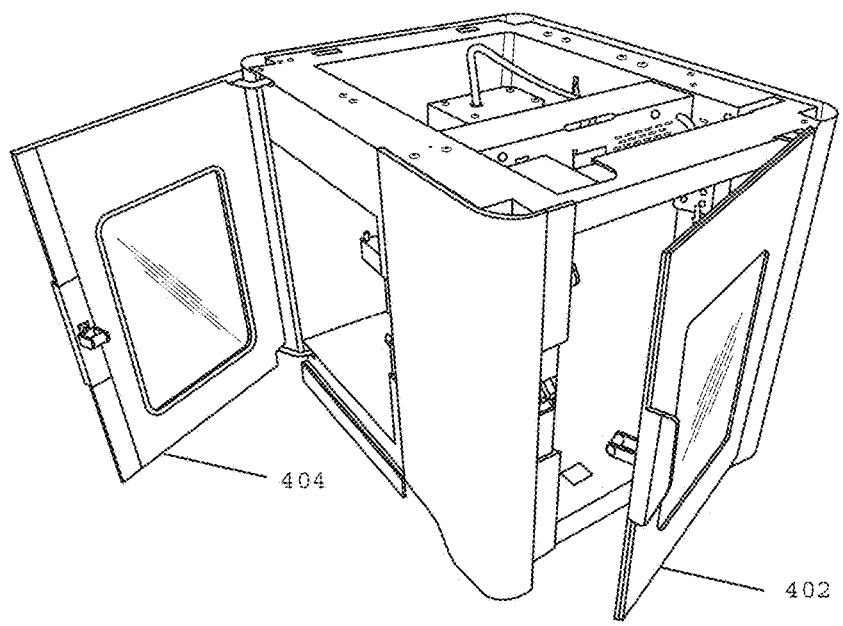
FIGS. 4A-4G are diagrams of a 3D printer, according to one embodiment of the invention.

FIGS. 4A-4G are diagrams of a 3D printer of the 3D printer management network 100 of FIG. 1, according to one embodiment of the invention. FIG. 4A shows a side elevational view of the 3D printer. In FIG. 4A, the top panel of the 3D printer has been removed, and both the filament access panel 402 as well as the door to the 3D printing area 404 are opened. Both the filament access panel 402 as well as the door to the 3D printing area 404 may be locked to prevent unauthorized access. In one embodiment, only an administrator may open the filament access panel 402. An authorized user may open the door to the 3D printing area 404 by using their authentication information (discussed in greater detail below). Both the filament access panel 402 and the door to the 3D printing area 404 may be unlocked by an administrator locally or remotely via the management server of the 3D printer management network.

Figure 4B:
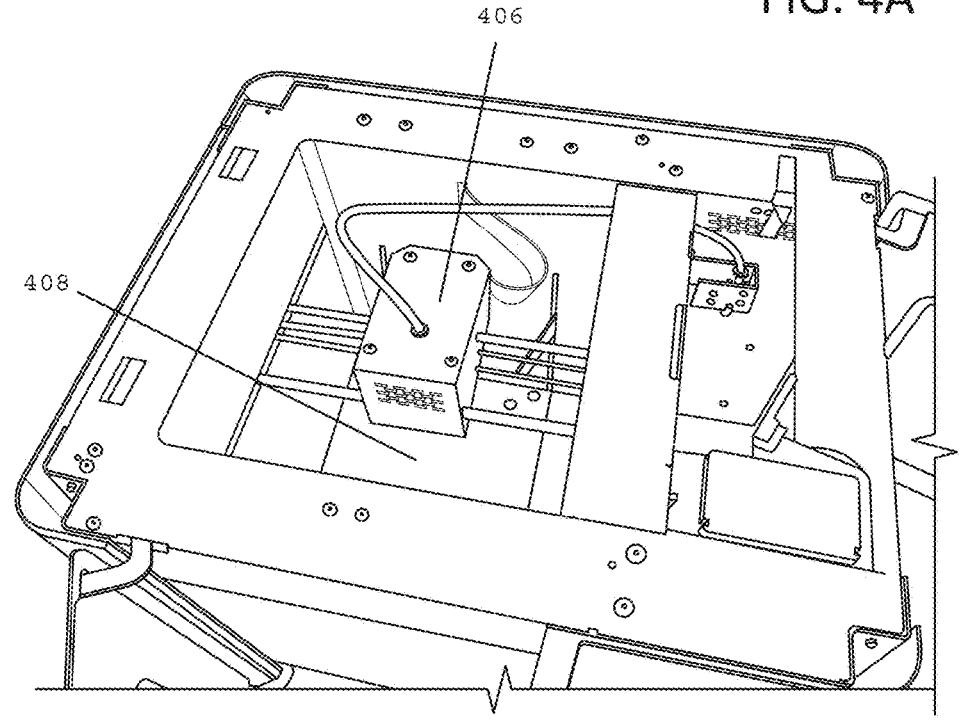
Figure 4C:
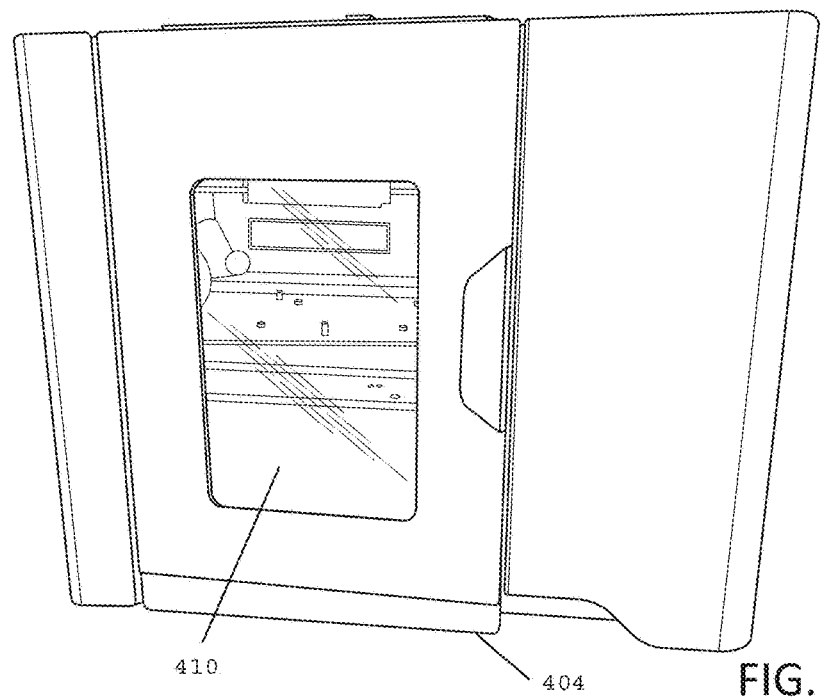

FIG. 4B shows a top elevational view of the 3D printer. As shown in FIG. 4B, a 3D printing head 406 is positioned above a 3D printing tray 408. FIG. 4C shows a side profile view of the 3D printer. In FIG. 4C, the door to the 3D printing area 404 is closed. A window 410 in the door allows users and administrators to visually monitor and inspect the 3D printing process without opening the door to the 3D printing area 404. In other embodiments, the window 410 may be configured to be transparent or opaque. In this embodiment, for example, the window 410 may be opaque during the printing of the 3D model to maintain confidentiality and security, and will turn transparent only after the user or an administrator logs into the 3D printer.

Figure 4D:
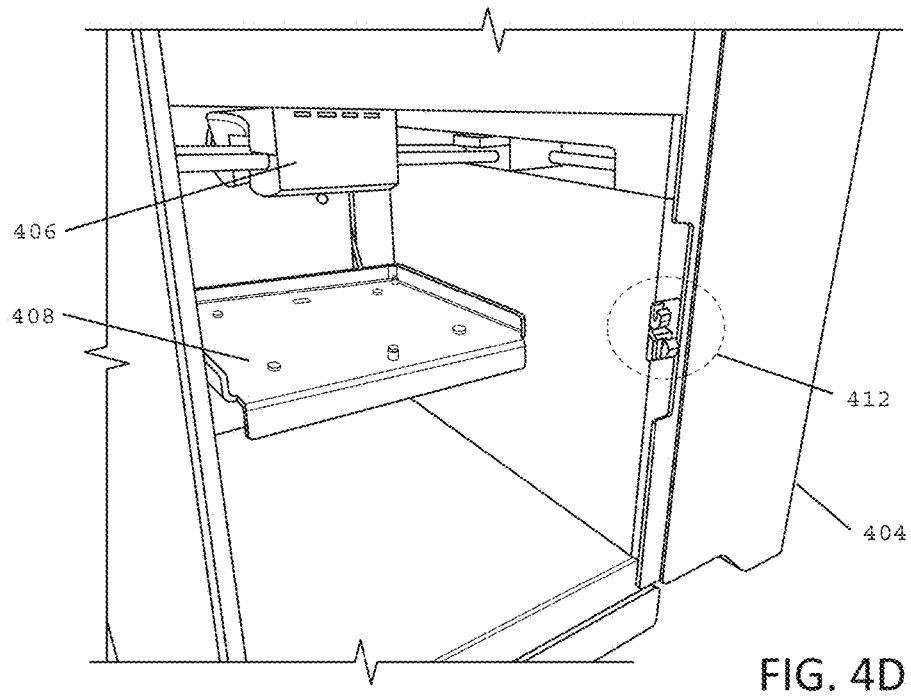

FIG. 4D shows another side profile view of the 3D printer. In FIG. 4D, the door to the 3D printing area 404 is opened. FIG. 4D provides another view of the position of the 3D printing head 406 and the 3D printing tray 408 shown in FIG. 4B. The locking mechanism 412 for the door of the 3D printing area is encircled in FIG. 4D. As shown in FIG. 4D, the locking mechanism 412 is an electromagnetic lock. As previously discussed, in other embodiments, the locking mechanism for the door of the 3D printing area can be any suitable locking mechanism.

Figure 4E:
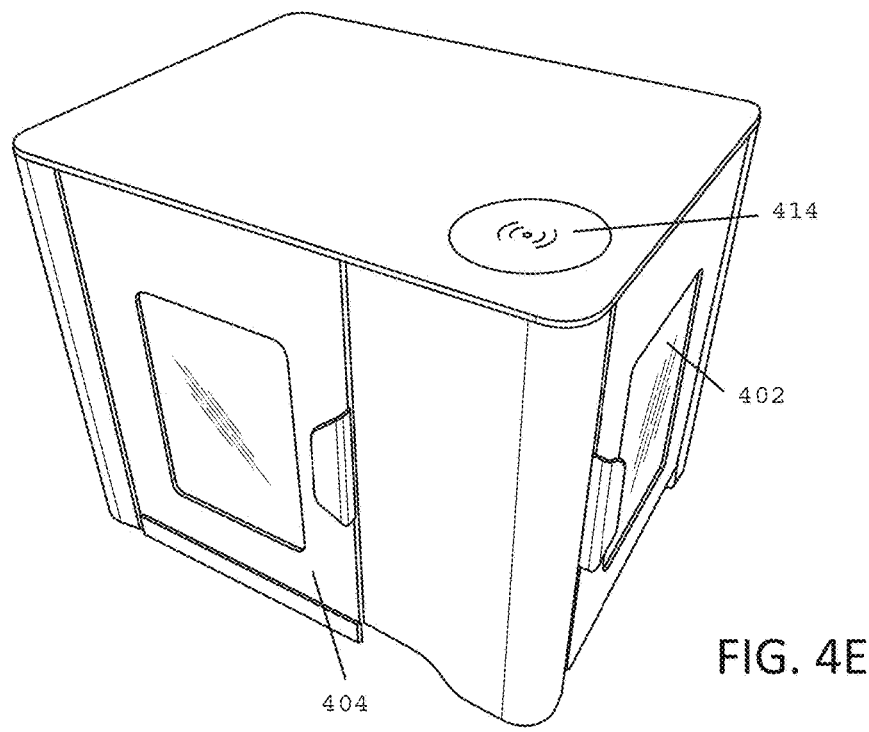
Figure 4F:
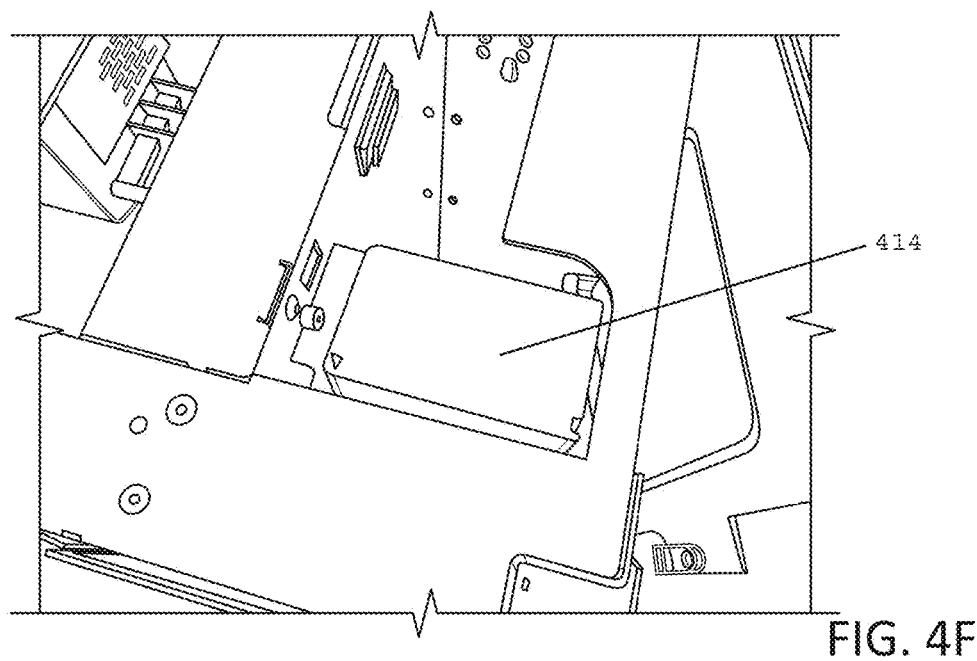
Figure 4G:
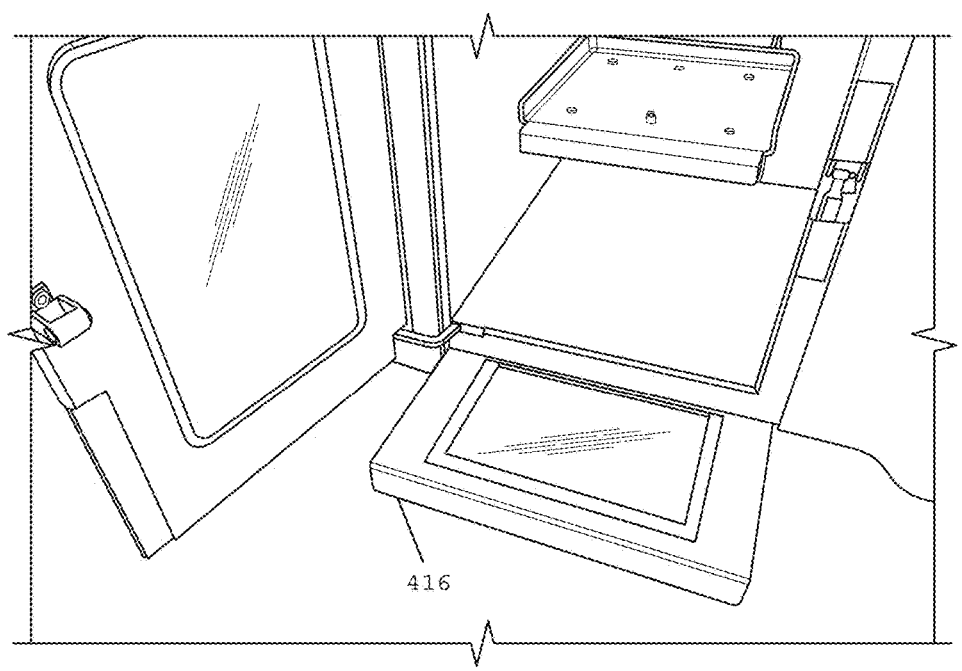

FIG. 4E shows another side elevational view of the 3D printer. In FIG. 4E, the top panel of the 3D printer is present, and both the filament access panel 402 and the door to the 3D printing area 404 are closed. As shown in FIG. 4E, a card reader 414 is located on the top right corner of the 3D printer. FIG. 4F shows a top view of the top right corner of the 3D printer. In FIG. 4F, the top panel of the 3D printer is removed, and the card reader 414 can be seen. FIG. 4G is another side elevational view of the 3D printer. In FIG. 4G, the user interface of the 3D printer 416 has been extended from underneath the 3D printer for use by a user or administrator.

Figure 5A:
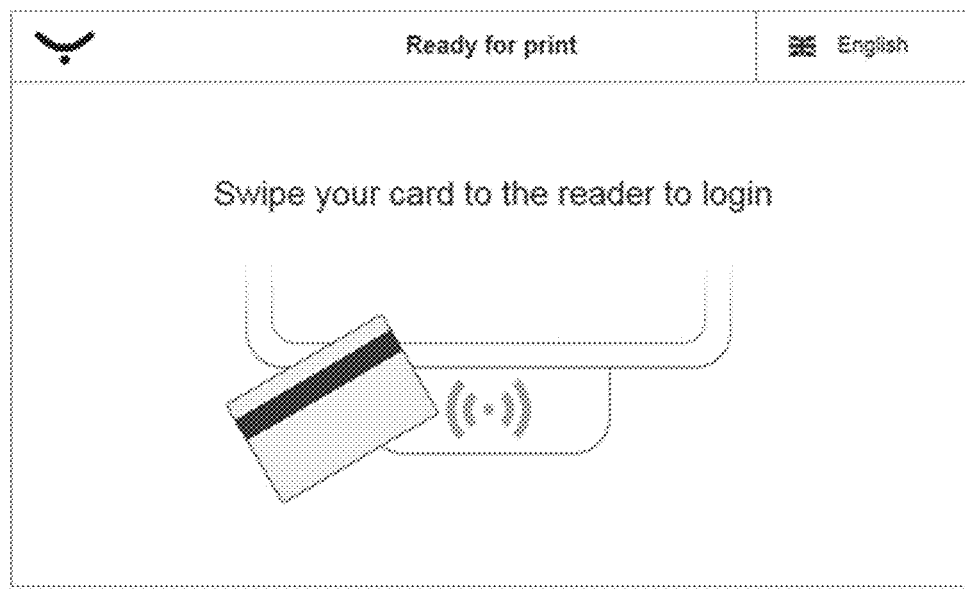
FIGS. 5A-5I are screen images of the user interface of an additive printer, such as a 3D printer, according to one embodiment of the invention.
Figure 5B:
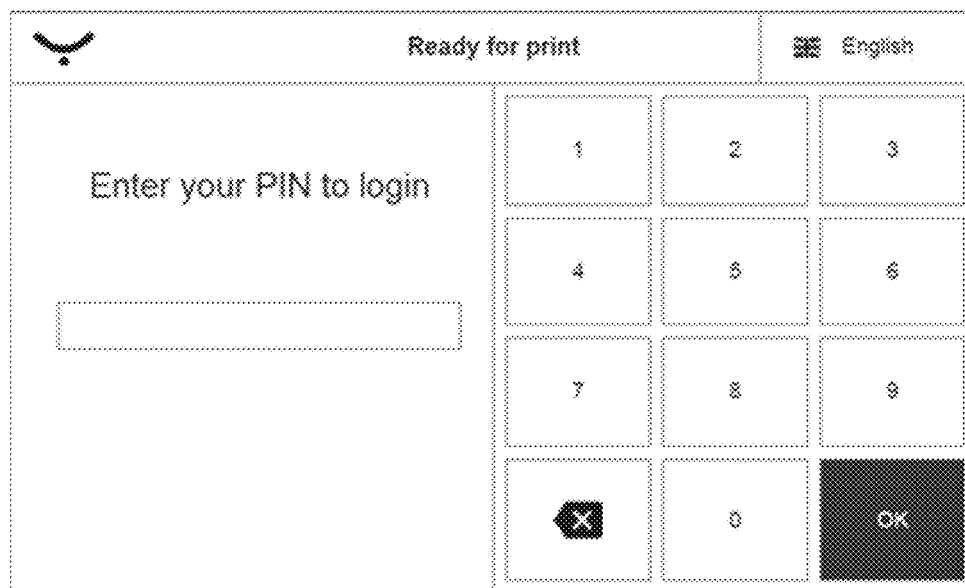
Figure 5C:
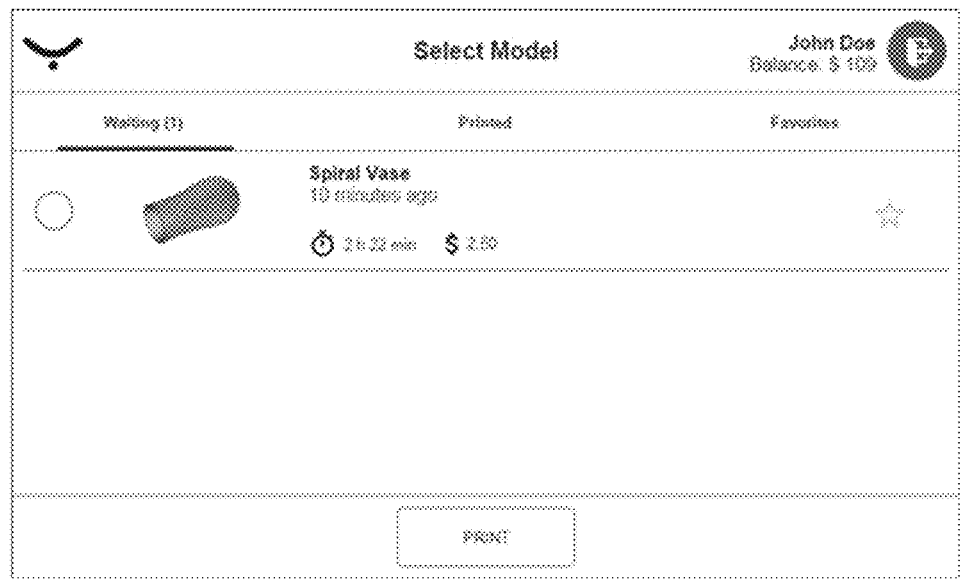

FIGS. 5A-5I are screen images of the user interface of a 3D printer, according to one embodiment of the invention. FIG. 5A shows a default authentication screen instructing the user to swipe the user's card in order to login. FIG. 5B shows the PIN authentication screen after a user has swiped his or her card. Once the user enters the correct PIN, FIG. 5C shows the user's account screen. As shown in FIG. 5C, the user "John Doe" has previously sent a request to 3D print a 3D printing file entitled "Spiral Vase" to a management server 10 minutes ago. As previously discussed, once an authorized user is logged in, the user interface of the 3D printer will retrieve the user's account information from the management server, including any requested print jobs (and associated metadata such as estimated time to print and cost to print), the user's account balance, etc. In FIG. 5C, John Doe's account screen also displays an estimated time to print the Spiral Vase is 2 hours and 22 minutes, and will cost John Doe $2.50 to print. John Doe's account balance can be seen at the top right corner of the user's account screen.

Figure 5D:
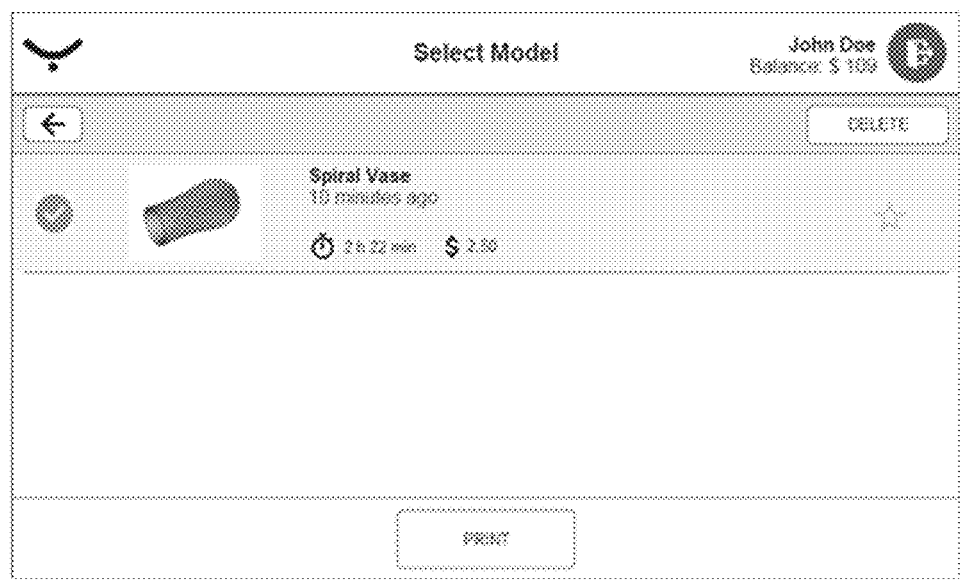
Figure 5E:
Figure 5F:
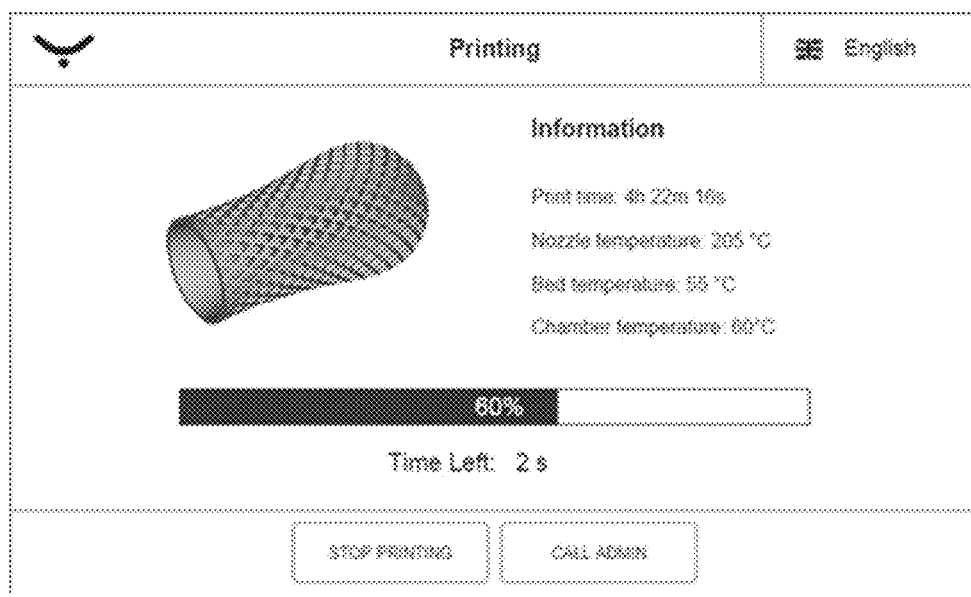

In FIG. 5D, user John Doe selects the Spiral Vase for printing. FIG. 5E shows an instruction screen instructing John Doe to open the door to the 3D printing area of the 3D printer to prepare the 3D printer for printing. In one embodiment, glue needs to be applied to 3D printing tray and the 3D printer needs to be calibrated prior to printing. FIG. 5F shows a printing status screen indicating the current information of the printing of the Spiral Vase. Status information includes the print time, time remaining, percentage completion, and temperature readouts of various components of the 3D printer. The printing status screen also includes options to stop printing and to call the admin if the user detects an issue during printing.

Figure 5G:
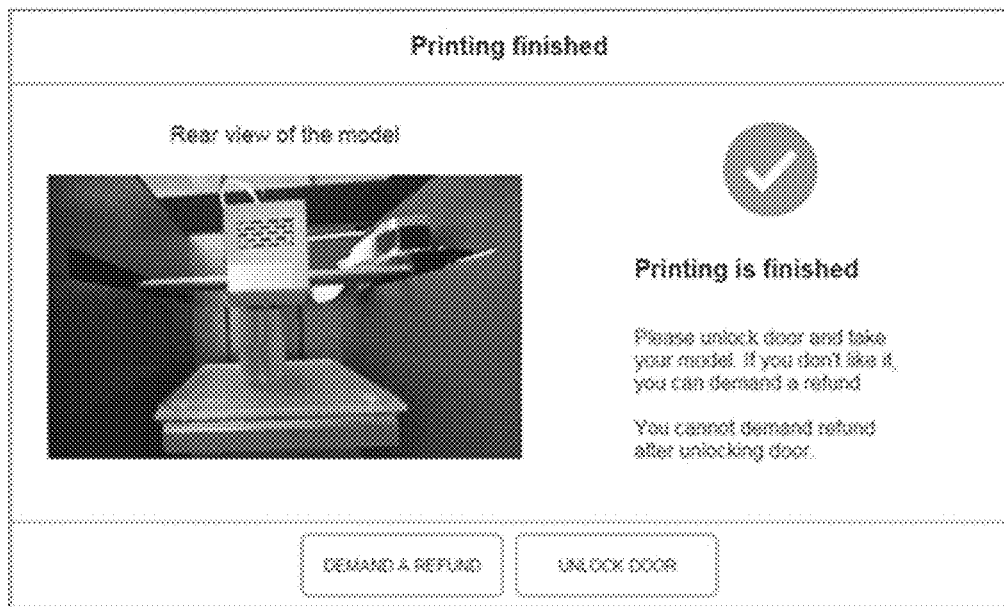

In FIG. 5G, a printing finished screen notifies user John Doe that Spiral Vase has completed printing. After the printing is complete, John Doe may demand a refund if he is unsatisfied with the printed Spiral Vase, or if he is satisfied, he can unlock the door to the 3D printing area and retrieve his printed Spiral Vase. The printing finished screen includes a camera image from the back of the 3D printing area, which in combination with the windowed door, provides users up to a 360 degree view of the printed object to determine if they are satisfied with the printed object. In another embodiment, the camera may be positioned in front of the printing area or in any other portion of the printing area.

Figure 5H:
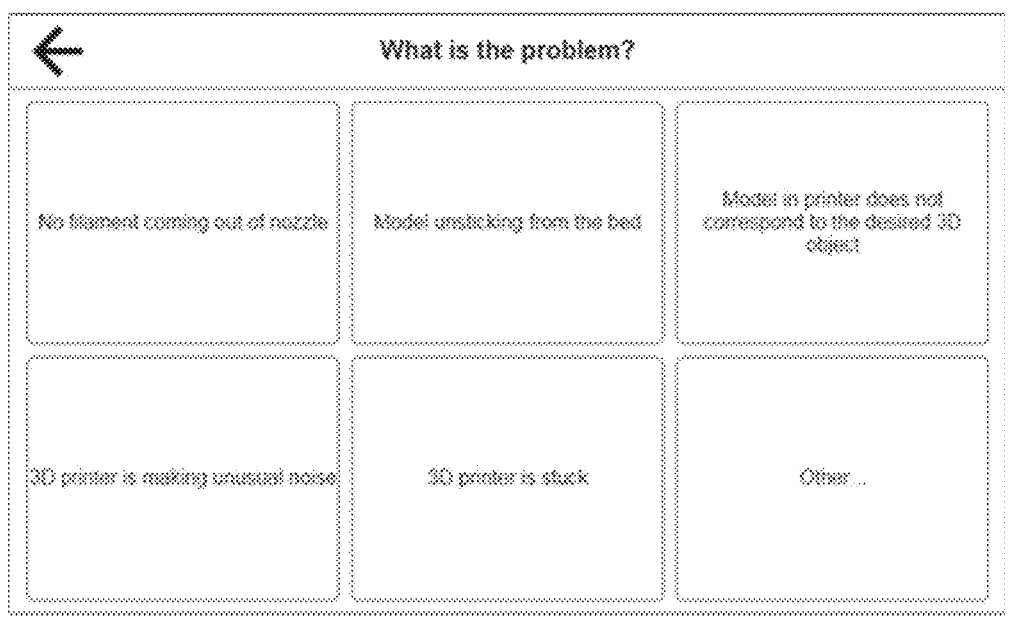
Figure 5I:
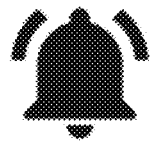

FIG. 5H shows a call admin screen. As previously shown in FIG. 5F, during printing the user may call the admin for assistance. As shown in FIG. 5H, there are a number of different issues that may occur during the 3D printing process. A number of these issues are identified for the user in the form of shortcut buttons, and if the user is not experiencing any of the preset issues, the user may select the "other" button and may be given the option to describe the issue. FIG. 5I shows an admin notification screen. In FIG. 5I, after the user selects the issue on the call admin screen (shown in FIG. 5H), the user is informed that an administrator has been notified of the issue, and is given an estimated time for an administrator to come and address the issue identified by the user.

Figure 6:
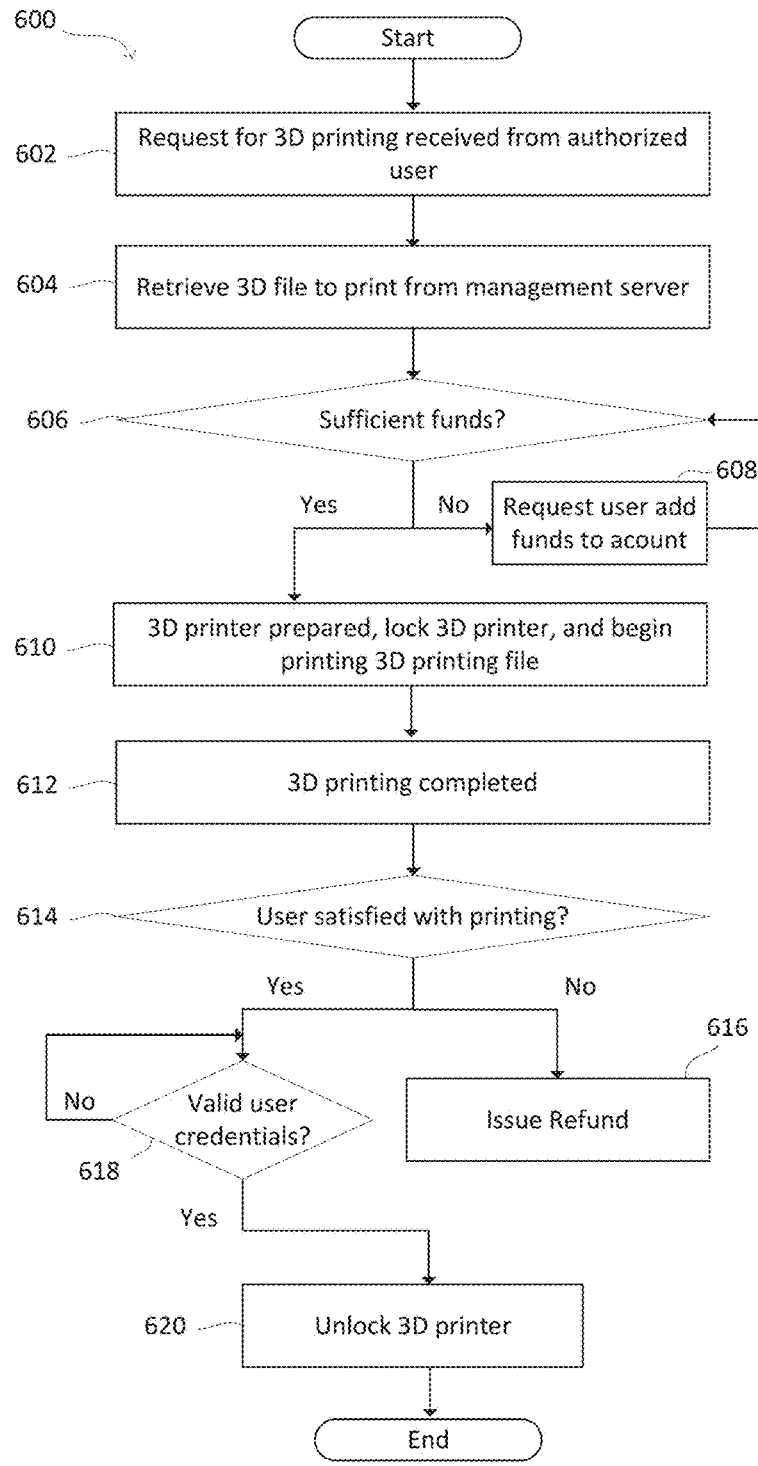
FIG. 6 is a flowchart of method steps for securely printing a 3D printing file using the 3D printer management network of FIG. 1, according to one embodiment of the invention.

FIG. 6 is a flowchart of method steps 600 for securely printing a 3D printing file using the 3D printer management network 100 of FIG. 1, according to one embodiment of the invention. At step 602, a request for 3D printing of a 3D printing file is transmitted from a user to the management server. In one embodiment, the request may be sent from a user device. In another embodiment, the request may be sent from the user interface of a 3D printer within the 3D printer management network.

At step 604, a user logs into his or her user account from a 3D printer and selects the previously transmitted printing file to be printed. The 3D printer retrieves the 3D printing file from the management server 120. At step 606, the management server checks the user account information of the user and determines if the user has sufficient funds for printing the user's 3D printing file. The estimated cost of printing a 3D printing file may be based on an estimated amount of time it takes the print the 3D printing file, an estimated amount of material required to print the 3D printing file, the complexity of the 3D printing file, or any combination of any relevant cost considerations. At step 608, if the management server determines there are insufficient funds in the user's account, the management server will send a request to the user to add funds to the user's account.

At step 610, if the management server determines the user has sufficient funds to print the 3D printing file, the user's account will be deducted the estimated amount for printing the 3D printing file. The user then prepares the 3D printing area of the 3D printer for printing. In one embodiment, the user must apply an adhesive to a 3D printing tray below a 3D printing head of the 3D printer, and calibrate the 3D printer prior to printing. In another embodiment, adhesive may not be required. After the 3D printer has been prepared, the 3D printing area of the selected 3D printer is locked, and the 3D printer begins printing the 3D printing file. The 3D printer updates its status from idle to in progress, and in one embodiment, transmits its status to the management server. In another embodiment, the management server incrementally deducts the total cost of the print job from the user's account as the printing process progresses.

At step 612, the 3D printing is completed, the 3D printer updates its status to printing completed, and the user is notified. In one embodiment, the user may be notified directly by the 3D printer. In another embodiment, the 3D printer transmits a message to the management server, which then sends a success notification to the user. The user notification may be sent to the using any suitable method, including via a text message, email, an automated phone message, or any other suitable method, or any combination thereof.

At step 614, the user inspects the printed object and determines if he or she is satisfied with the print job. In one embodiment, this determination may be made by visually observing the 3D printed object. At step 616, if the user is not satisfied with the print job, the user may demand a refund. At step 618, if the user is satisfied with the print job, the user provides his or her authentication information to the 3D printer. As previously discussed in connection with FIG. 2, the user's authentication information may comprise a user's username and associated password, a user's identification and associated pin number, a user's card number, a user's RFID tag, a user's biometric data, or any other suitable identification information, or combination thereof. In one embodiment, the user may enter their authentication information via the user interface of the 3D printer.

At step 620, if the user provides valid authentication information, the 3D printing area of the 3D printer is unlocked and the user may retrieve the 3D printed object. If the user is unable to provide valid authentication information, the user is prompted to try again. If the user is unable to provide valid authentication information after a number of attempts, in one embodiment, the user's account is locked and the user must seek an administrator to unlock the user's account. After the user retrieves the 3D printed object, the actual cost of the print job (based on the amount of time and material used) will be calculated and the actual cost will be billed to the users account. For example, if at step 606 the estimated amount is greater than the actual cost of printing, then the user's account will be credited the difference. Conversely, if the estimated amount is less than the actual cost of printing, then the user's account will be deducted the difference.

Figure 7A:
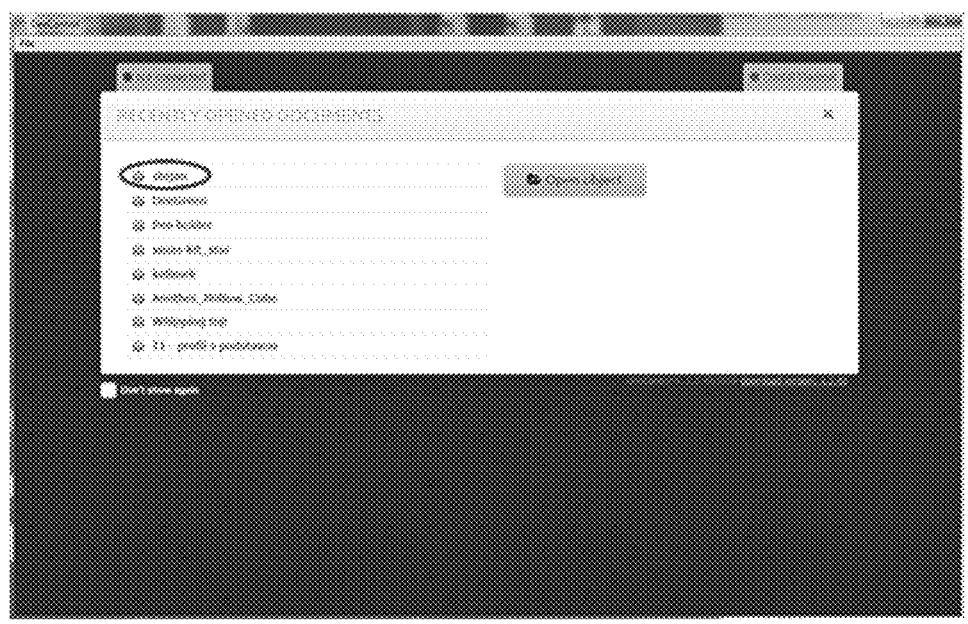
FIGS. 7A-7E are screen images of the user interface of a user device of the additive printer management network of FIG. 1, according to one embodiment of the invention.
Figure 7B:
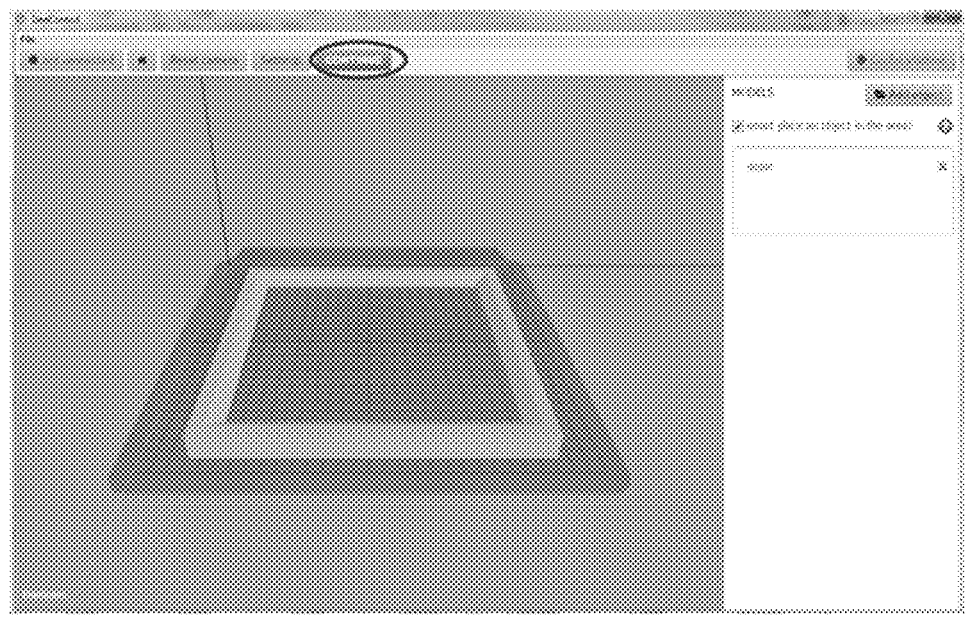
Figure 7C:
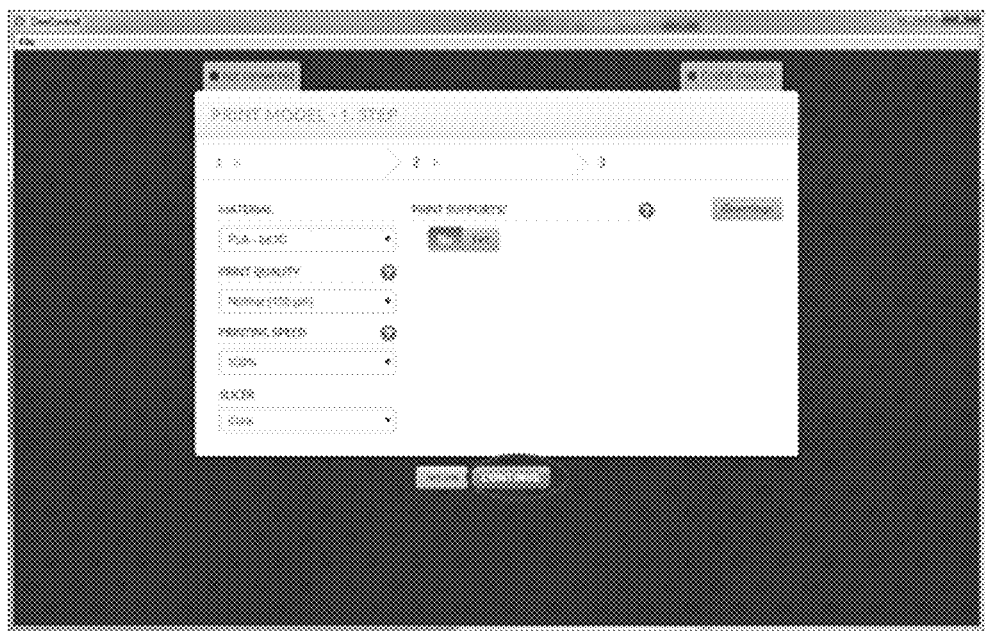

FIGS. 7A-7E are screen images of the user interface of a user device of the 3D printer management network 100 of FIG. 1, according to one embodiment of the invention. FIG. 7A shows a 3D file selection screen of the user device. A user may select a 3D file to print by selecting the file name, and selecting the "Open object" button. FIG. 7B shows a preview screen with a 3D model of the selected 3D file for printing. The user may modify the 3D model from the preview screen shown in FIG. 7B prior to printing. If the user is satisfied with the 3D model for printing, the user may select the continue button. FIG. 7C shows a print parameter screen. The user may select the material, print quality, speed, and slicer used to print the 3D model. Additionally, depending on the shape of the 3D model, the user may optionally elect to print supports along with the 3D model.

Figure 7D:
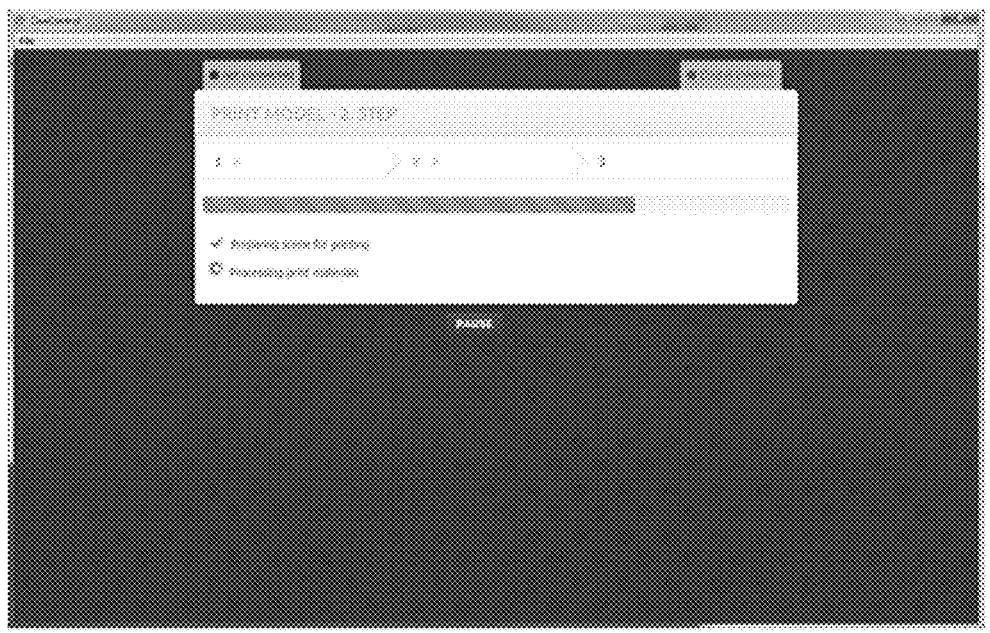
Figure 7E:
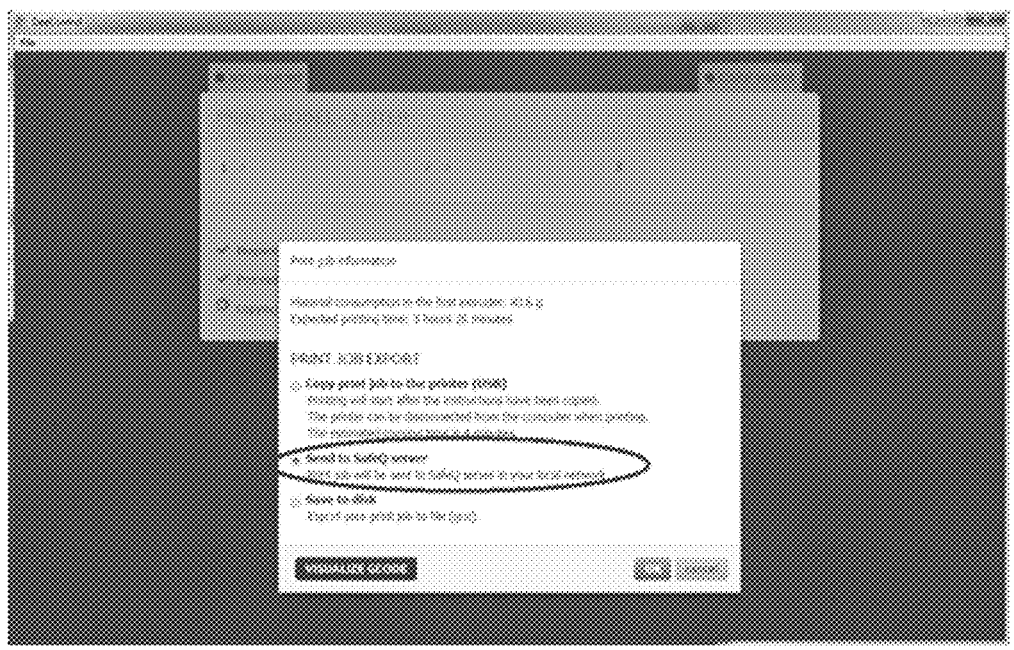

FIG. 7D shows a processing screen indicating that the user device is processing the 3D model for printing using the parameter selected by the user. In one embodiment, preparing the 3D model includes slicing the model, generating supports (if elected), generating and optimizing the printing instructions for the 3D printer. FIG. 7E shows a print request screen. After the 3D model has been processed into a 3D printing file, the user may send the print request along with the 3D printing file to the management server. After the print request is sent to the management server, the user can then use any 3D printer from the 3D printer management network 100 to retrieve the 3D printing file from the management server and print the 3D model as previously discussed in connection with FIGS. 5A-5I.

Figure 8A:
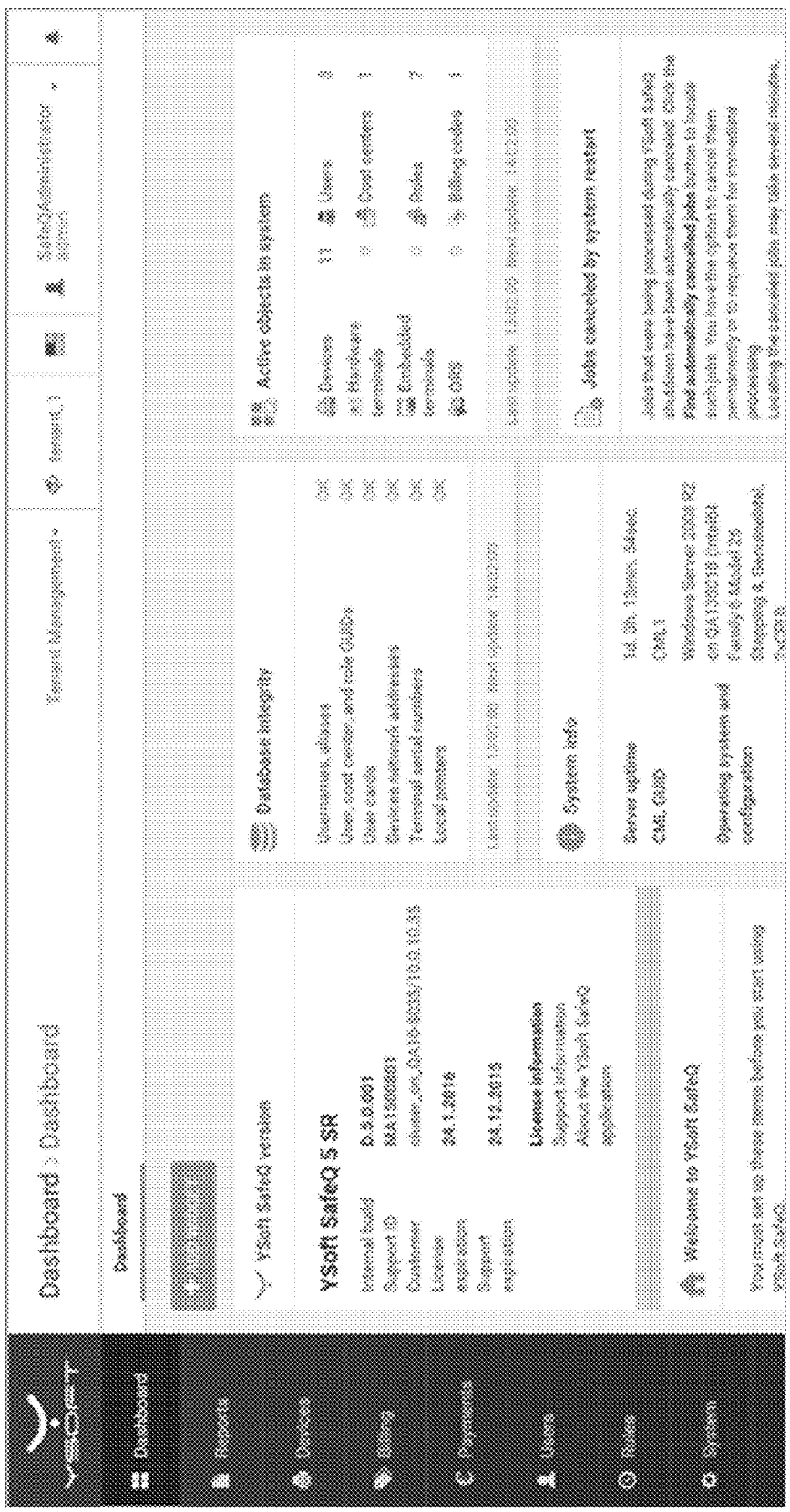
Figure 8B:
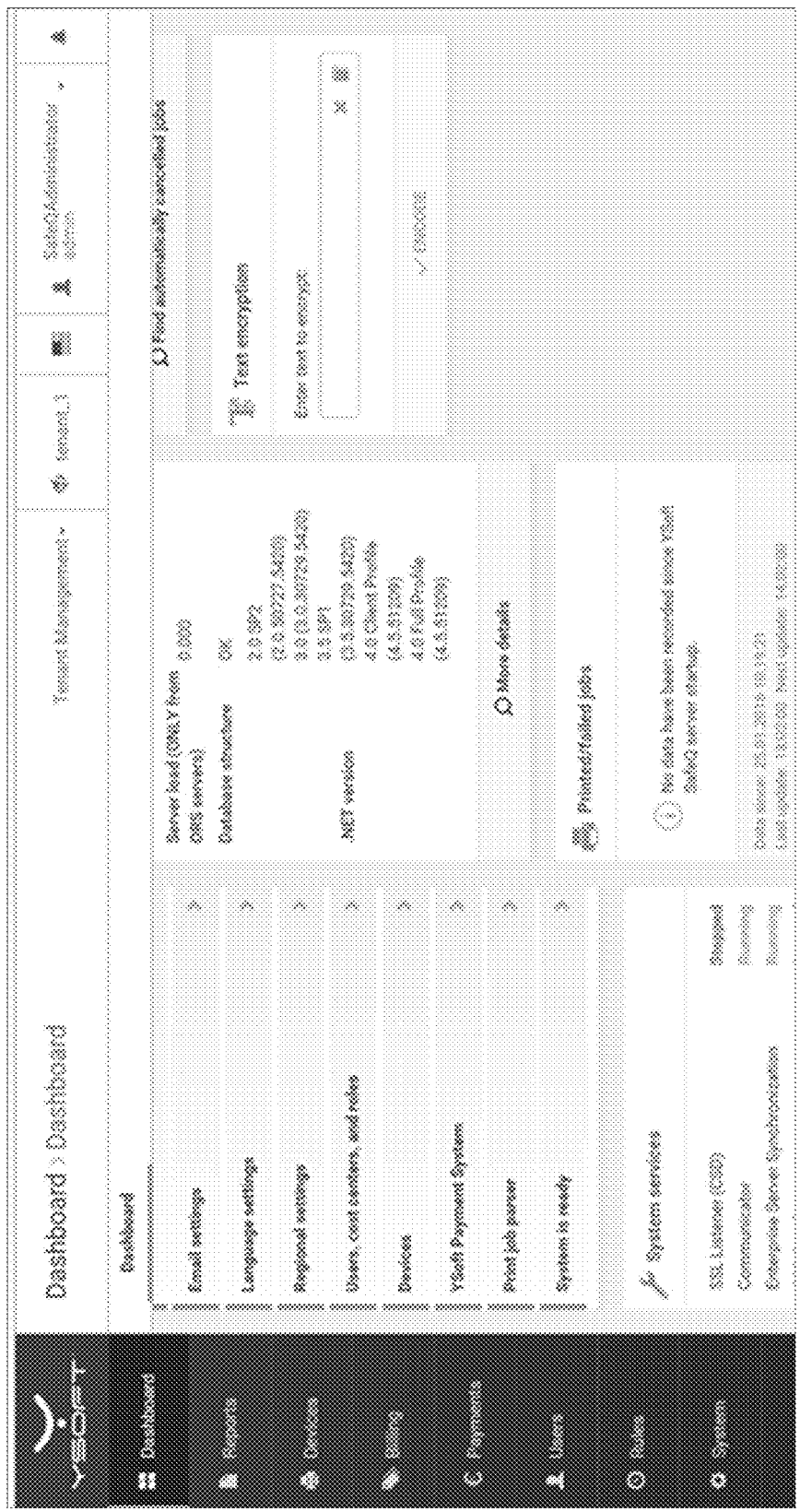
Figure 8C:
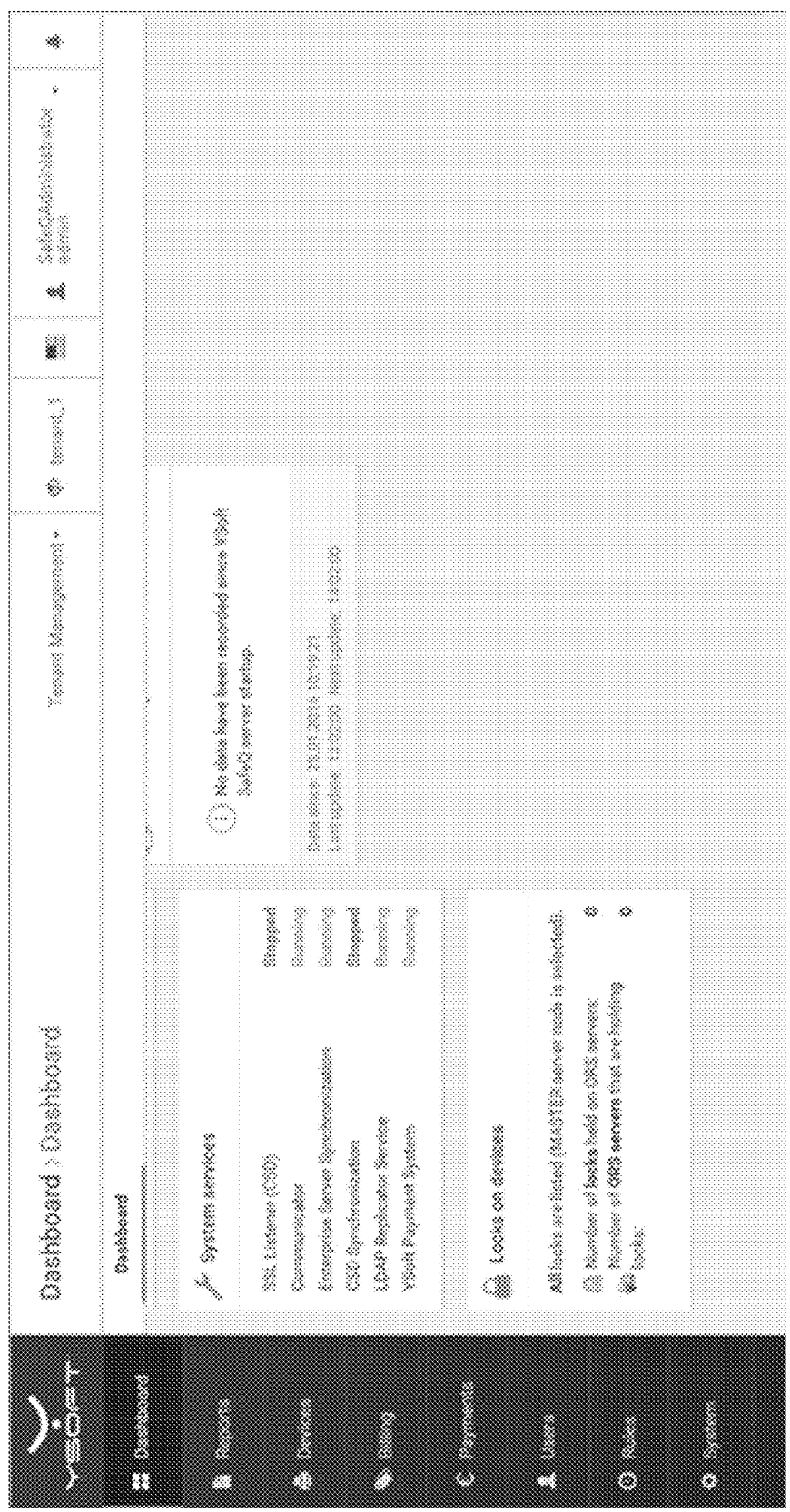

FIGS. 8A-8K are screen images of the administrator interface of a management server of the 3D printer management network 100 of FIG. 1, according to one embodiment of the invention. FIGS. 8A-8C shows an administrator dashboard screen that includes general operating information regarding the 3D printer management 100. As shown in FIG. 8A, the administrator dashboard screen contains high-level information regarding the database integrity, management server information, active objects (including 3D printers and authorized users) in the 3D printer management network 100, and any printing jobs that were canceled as a result of a system restart. As shown in FIG. 8B, the administrator dashboard screen further contains shortcuts to various system settings, including email settings, language settings, regional settings, user settings, device settings, payment settings, and print job parser settings. Finally, as shown in FIG. 8C, the administrator dashboard screen also includes high-level status information regarding system services and locks on devices.

Figure 8D:
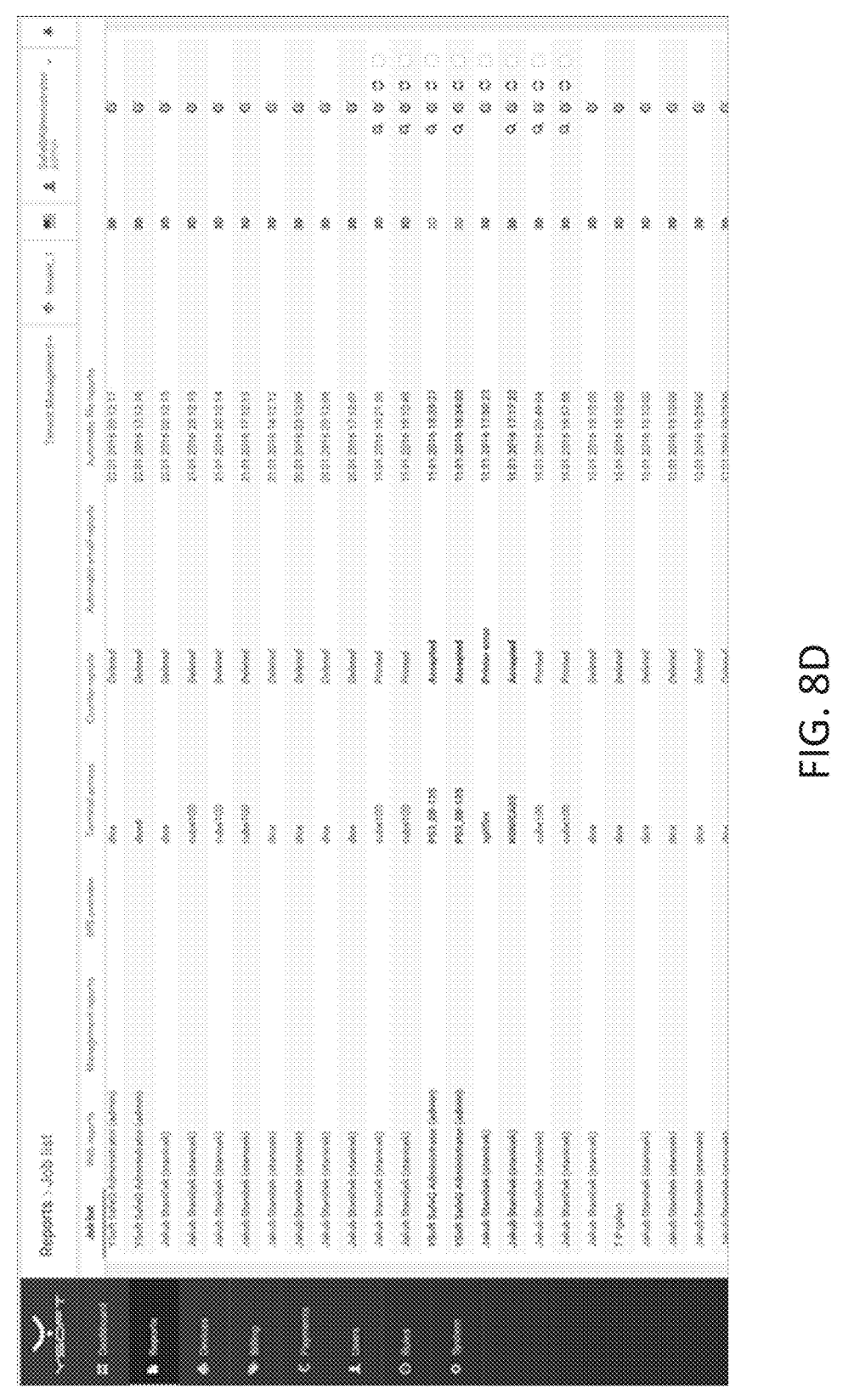
Figure 8E:
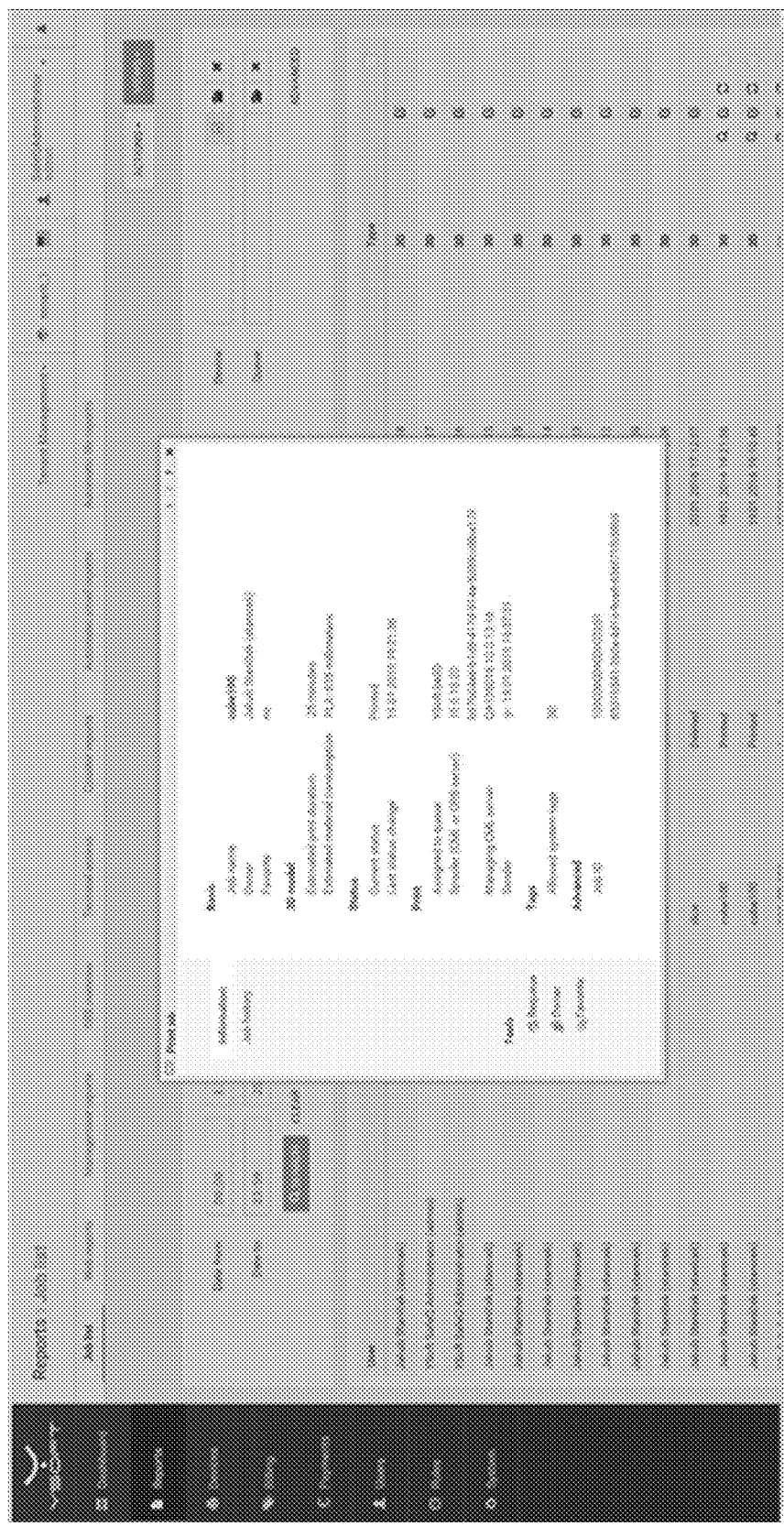

FIG. 8D shows a reports screen providing a report of the print requests received from authorized users. The reports screen includes information regarding the print request, including the user's identification, the device the print request originated from, the status of the print request (accepted, printed, deleted, printer error, etc.), the time the request was made, and the type of printing requested. FIG. 8E shows a summary screen of a user's print request. As shown in FIG. 8E, the summary screen includes basic information including the file name and the owner of the file, information about the 3D model to be printed, including the estimated time it will take to print the model and the amount of material required, information regarding the status of the print job, and the identification numbers of the print job and management server.

Figure 8F:
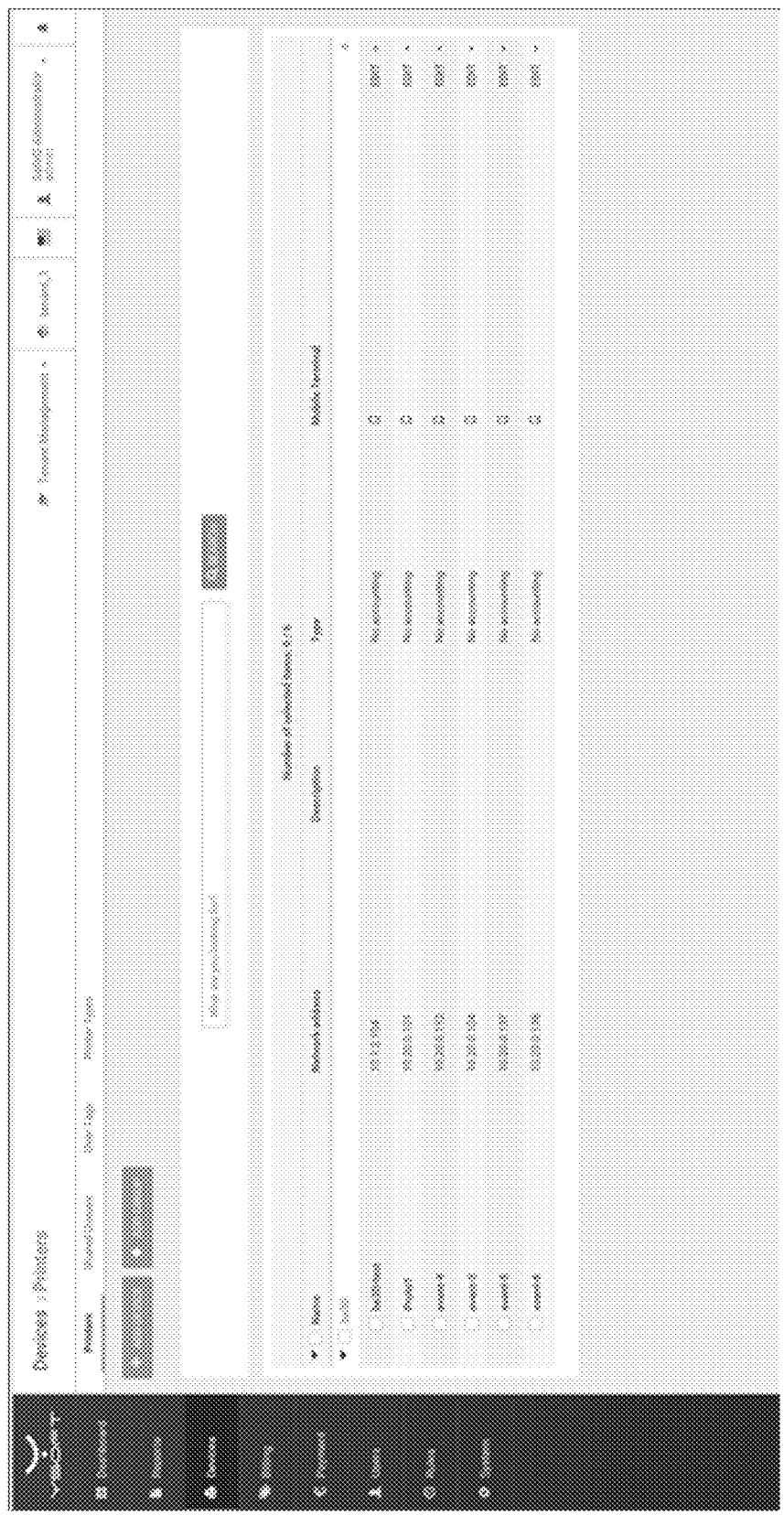
Figure 8G:
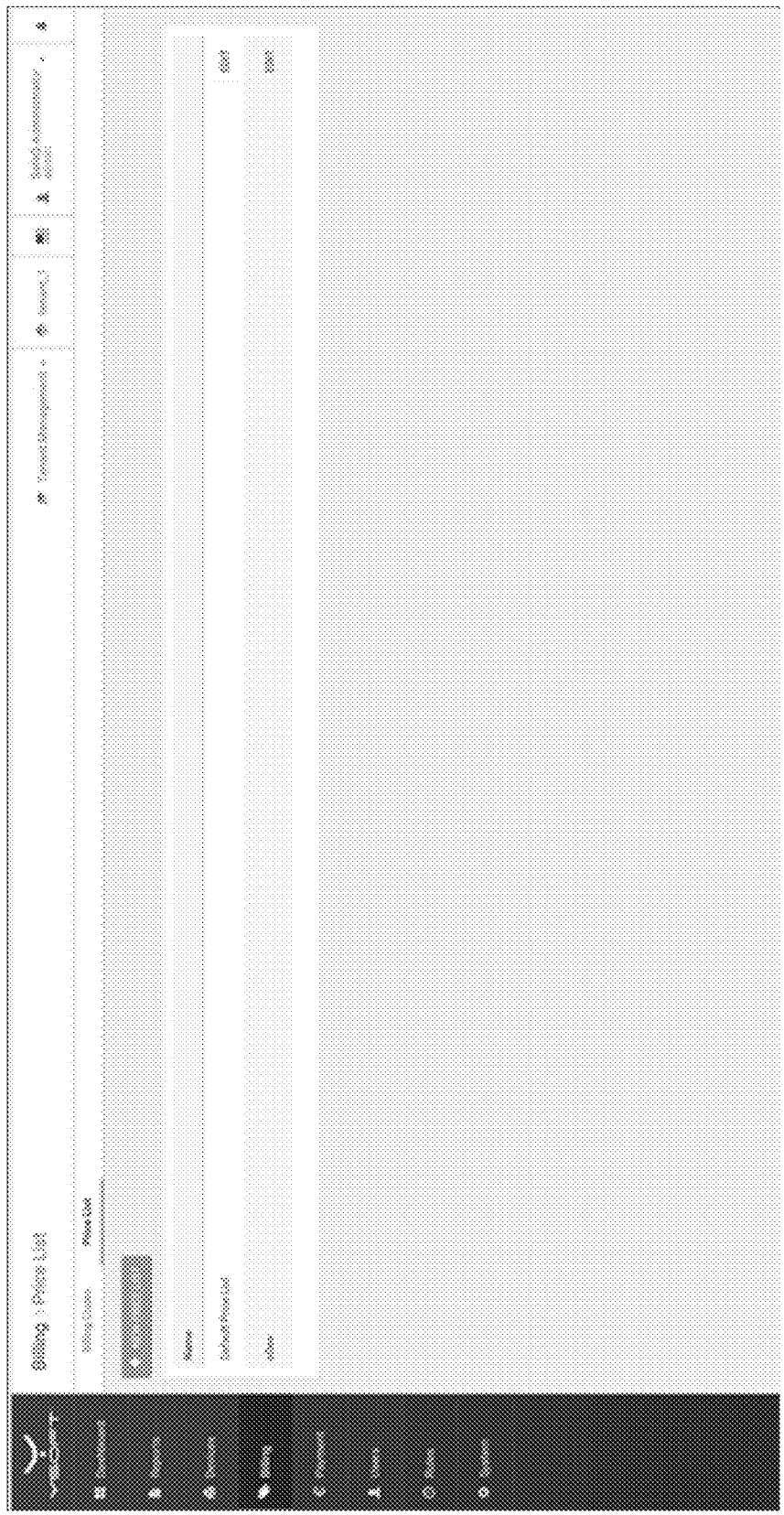

FIG. 8F shows a devices screen indicating the 3F printers currently connected to the 3D printing network 100. As shown in FIG. 8F, six 3D printers are currently connected to the network. From the devices screen of FIG. 8F, an administrator may also add new 3D printers to the 3D printing network 100 and group 3D printer devices together. FIG. 8G shows a billing screen with price lists for 3D printing requests. As shown in FIG. 8G, an administrator has created a custom price list entitled "eDee." Additionally, a default price list is available.

Price lists may be automatically calculated based on measured parameters (including type of material used, amount of material used, time, number of previous print requests, complexity of the 3D model, etc.). Additionally, statistics and analysis may be prepared for an administrator to help the administrator set custom price lists. In one embodiment, the administrator may apply different price lists to different 3D printers within the 3D printer network. In another embodiment, the administrator may apply different price lists to different users. From the price list screen of FIG. 8G, an administrator may also create a new price list and edit existing price lists. In one embodiment, changes to the price list may be automatically recommended to the administrator based on the specific circumstances of the 3D printing network 100. For example, the administrator may be recommended to increase the price list by 10% in order to ensure the 3D printer management network 100 is not being operated at a loss.

Figure 8H:
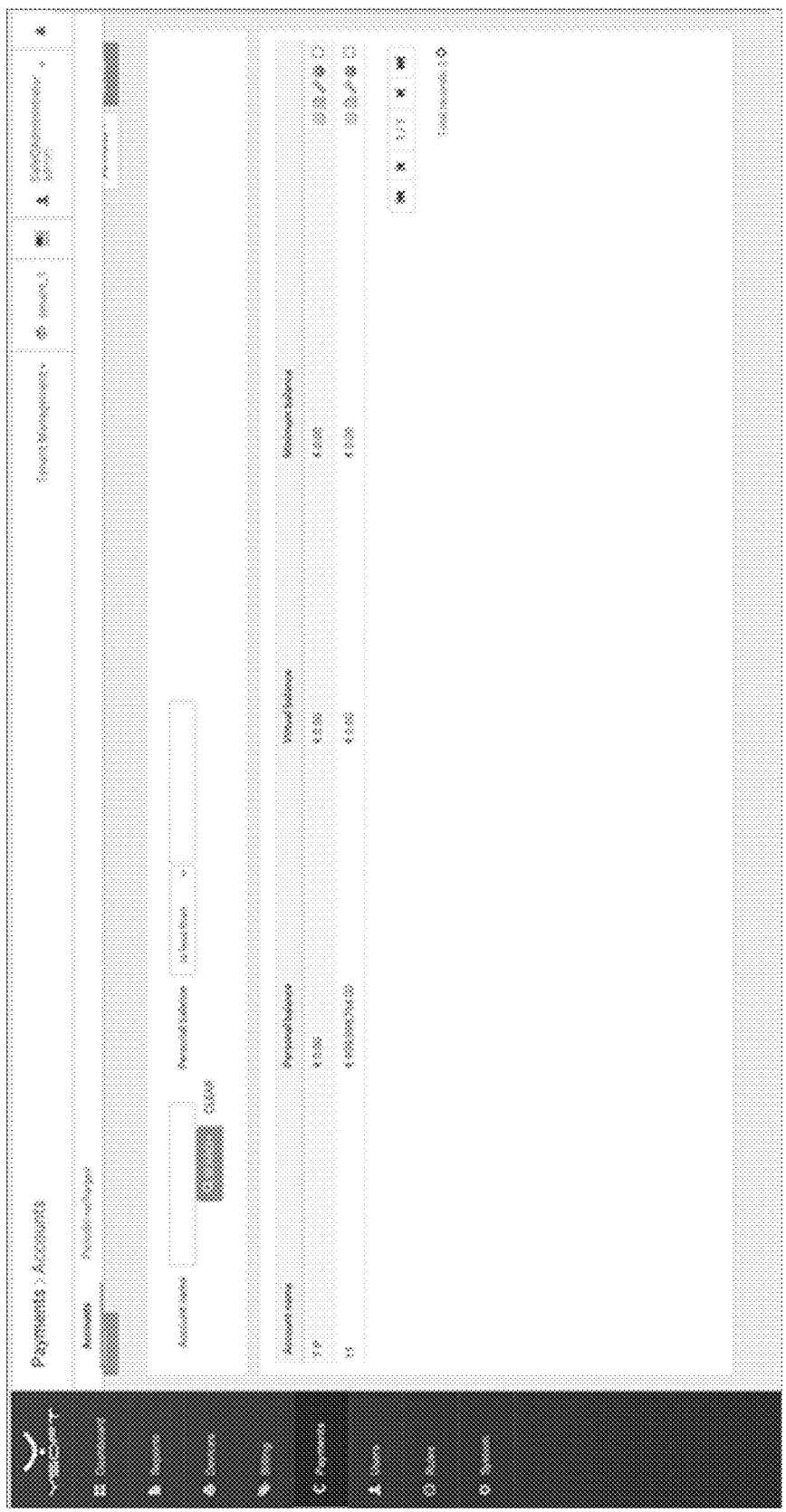
Figure 8I:
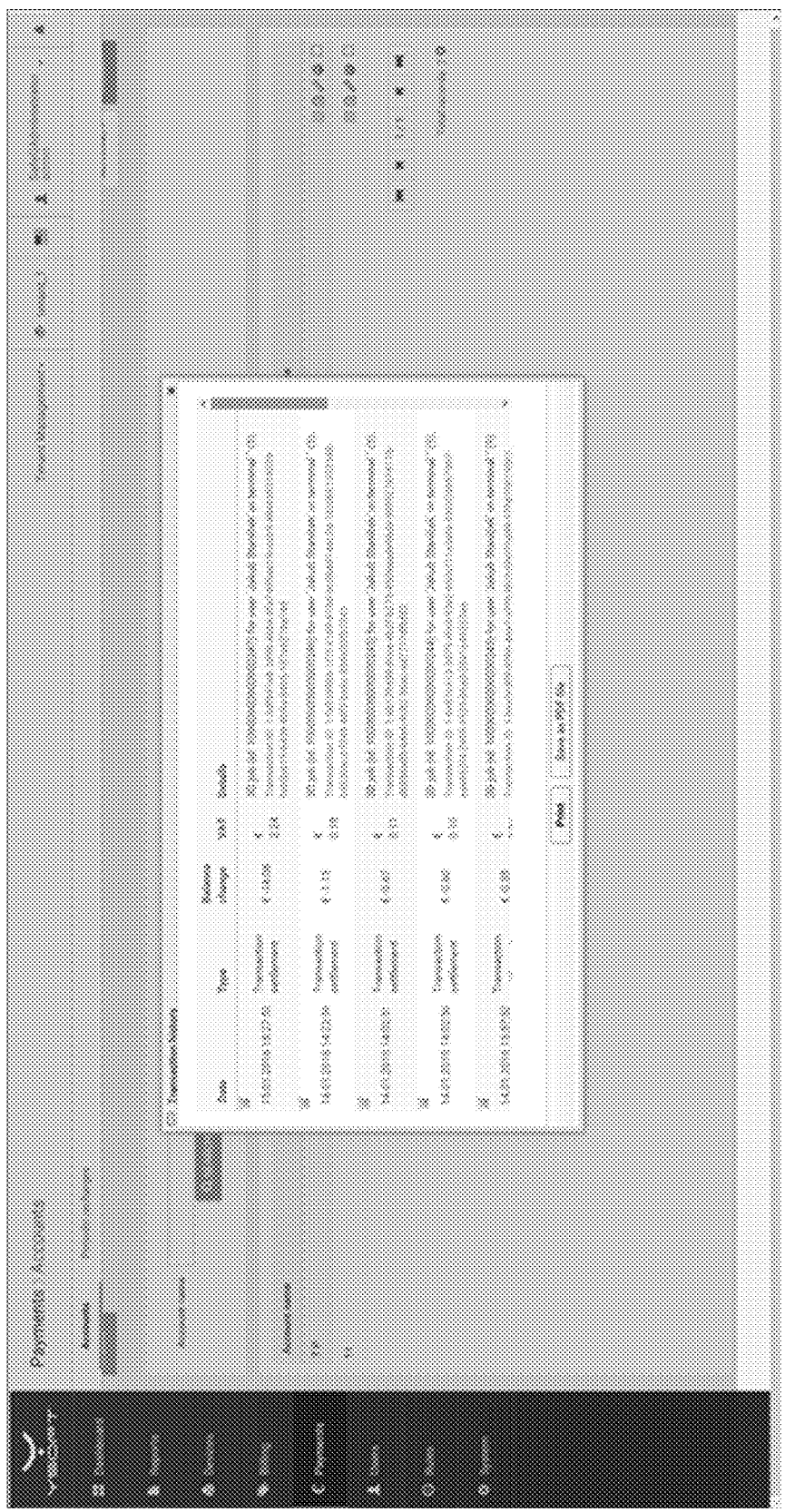

FIG. 8H shows a payment account screen summarizing the account balances of authorized users. From the payment account screen shown in FIG. 8H, an administrator may select and view the transaction history of each user, update the user's account balance, issue refunds, and set up periodic balance recharging for a user account, whereby the user's account is credited a specified amount every designated period. FIG. 8I shows a transaction history screen of a user. As shown in FIG. 8I, the transaction history of each user, including the transaction type, the amount charged, any taxes charged, and the details of the print job (including the transaction id) can be viewed by the administrator.

Figure 8J:
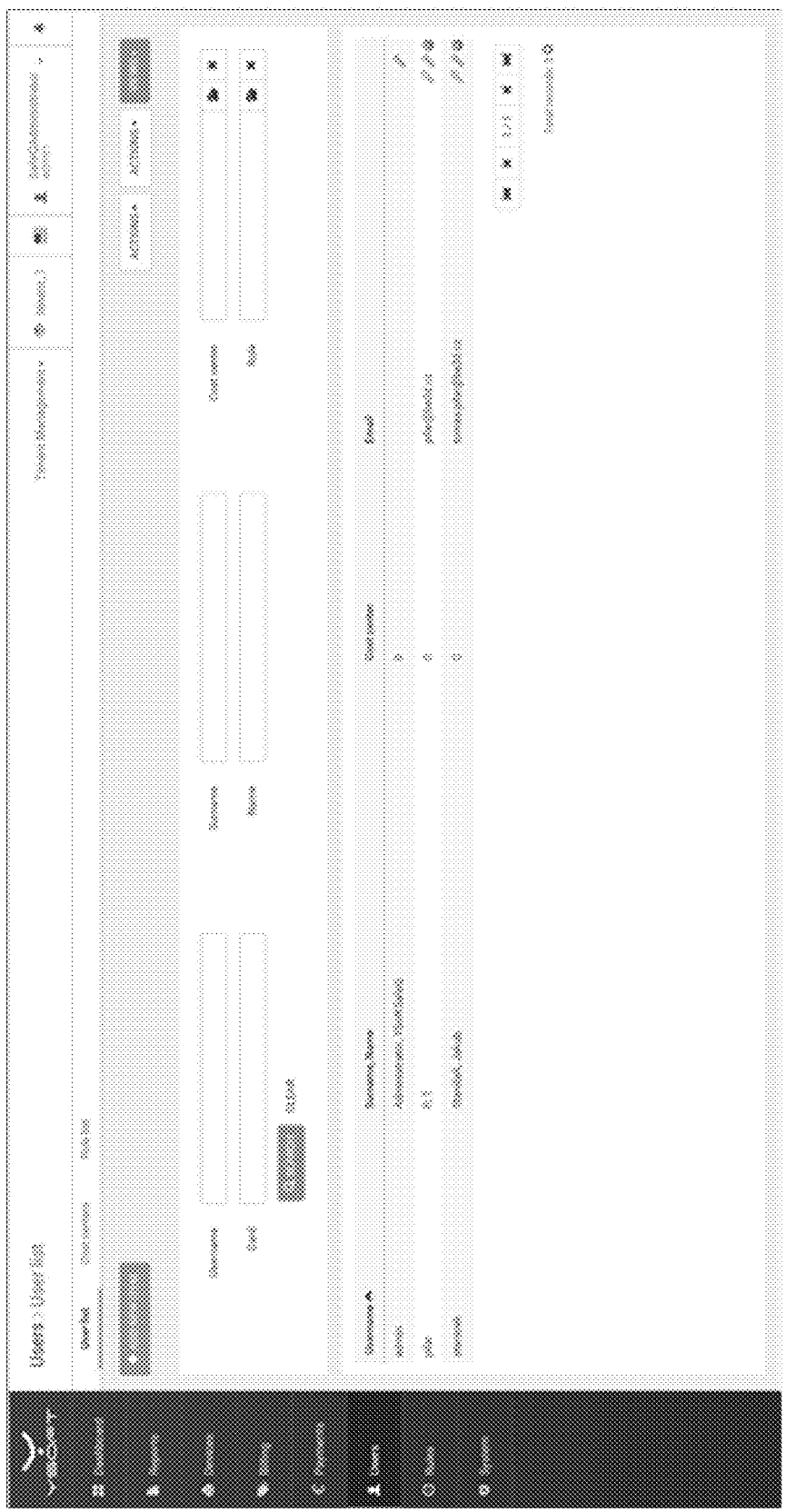

FIG. 8J shows a user account list screen identifying the authorized users of the 3D printer management network 100. As shown in FIG. 8J, there are three currently authorized users, however, the number of users that may be supported by the 3D printer management network 100 may be significantly greater than the number shown in FIG. 8J. Additional information about each user, including their name and email address is also displayed on the user account list screen. From the user account list screen shown in FIG. 8J, an administrator may modify a user's access rights within the 3D printer management network 100.

Figure 8K:
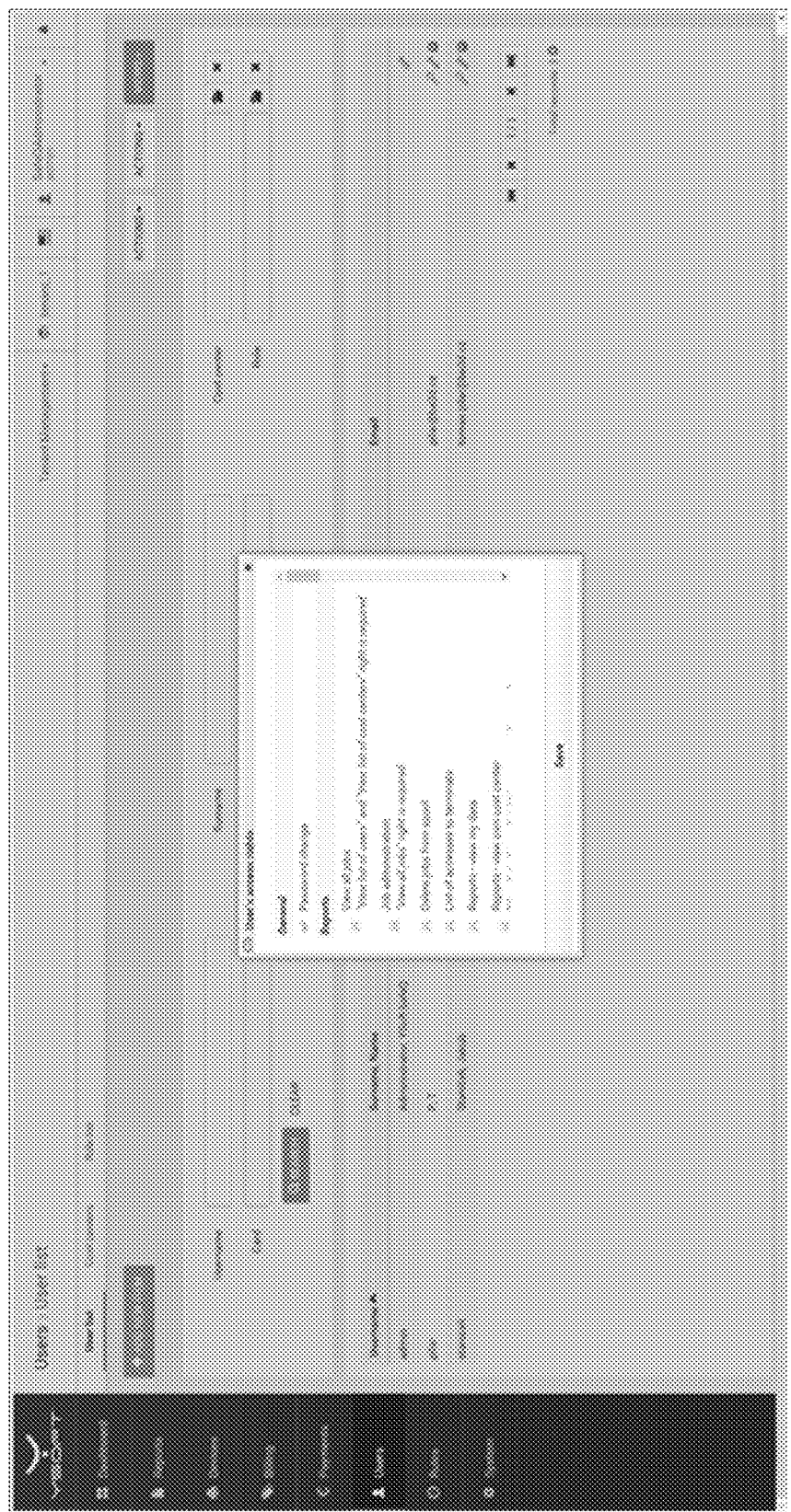

FIG. 8K shows a user's access rights screen for a user. As shown in FIG. 8K, an administrator has broad control over the access rights to the various features of the 3D printer management network 100, from access and control of the user's own account, to print job reports, and so on and so forth. In this manner, an administrator has full controller over what an authorized user can and cannot do within the 3D printer management network 100. An administrator may specify the access rights to each individual user, given an administrator full control and flexibility over each user's access rights.

Other objects, advantages and embodiments of the various aspects of the present invention will be apparent to those who are skilled in the field of the invention and are within the scope of the description and the accompanying Figures. For example, but without limitation, structural or functional elements might be rearranged, or method steps reordered, consistent with the present invention. Similarly, principles according to the present invention could be applied to other examples, which, even if not specifically described here in detail, would nevertheless be within the scope of the present invention. For example, the principles of the present invention are not limited to 3D printing, and can be equally applicable to any type of additive or subtractive manufacturing devices.

What is claimed is:

1. A printer management system comprising:
   one or more 3D printing devices each comprising
      a 3-dimensional printing region for printing according to a digital file;
      an opening through which a user may access the printing region;
      a moveable panel adapted to cover the opening when disposed in a closed position;
      a locking mechanism configured to lock the moveable panel in the closed position thereby preventing the user from accessing the printing region through the opening; and
   a management server communicatively coupled to each of the one or more printing devices over a communications network,
   wherein the management server is configured to
      receive a print request from one or more user devices or one of the one or more printing devices to print the digital file,
      transmit the digital file to a selected one of the one or more printing devices, and
      transmit commands to lock and unlock the locking mechanism of the one or more 3D printing devices.

2. The printer management system of claim 1, wherein the one or more printing devices are configured to lock the locking mechanism during printing of the digital file, and are capable of unlocking the locking mechanism upon receiving a command from the management server and from an authorized user.

3. The printer management system of claim 1, wherein the management server is further configured to update a printing status of each of the one or more 3D printing devices and the selected one or more 3D printing devices is selected based upon the printing status of each of the one or more 3D printing devices.

4. The printer management system of claim 3, wherein the printing status indicates printer operation time, printer occupation time, or printer material remaining.

5. The printer management system of claim 1, wherein the locking mechanism comprises an electromagnetic lock.

6. The printer management system of claim 1, wherein the locking mechanism comprises a mechanical bolt-action lock.

7. The printer management system of claim 1, wherein the one or more 3D printing devices further comprises a user interface,
   wherein the user interface is configured to
      authenticate an authorized user, and
      unlock the locking mechanism in response to an unlock command from the authorized user.

8. The printer management system of claim 7, wherein the management server is further configured to store a plurality of digital files, and the user interface is further configured to retrieve, in response to a request from the authorized user, a selected one or more digital files of the plurality of digital files for printing by the 3D printing device.

9. The printer management system of claim 7, wherein the user interface is further configured to transmit, in response to a print command from the authorized user, the print request to the management server.

10. The printer management system of claim 1, wherein the print request comprises the metadata for the digital file.

11. The printer management system of claim 10, wherein the metadata comprises at least one of a file name of the digital file, an owner of the digital file, an estimated time to print the digital file, and an estimated amount of material required to print the digital file.

12. The printer management system of claim 1, wherein the management server comprises:
    a user account subsystem configured to store or access individual user account information; and
    a security subsystem in communication with the user account subsystem and configured to store or access user authentication information associated with the individual user account information,
    wherein the security subsystem is further configured to receive and verify user authentication information from a user and (i) grant access to the associated individual user account information if the user's authentication information is verified, and (ii) deny access to individual user account information if not.

13. The printer management system of claim 12, wherein the security subsystem is further configured to
    store or access administrator authentication information,
    receive and verify administrator authentication information from an administrator and (i) grant access to individual user account information if the administrator's authentication information is verified, and (ii) deny access to individual user account information if not.

14. The printer management system of claim 13, wherein the management server further comprises a 3D printing device subsystem in communication with the security subsystem and is configured to
retrieve and update a printing status of each of the one or more 3D printing devices, and
provide the printing status to verified users and administrators.

15. The printer management system of claim 12, wherein the user authentication information comprises at least one of a password, pin number, card number, biometric data, and RFID tag.

16. The printer management system of claim 12, wherein the individual user account information comprises at least one of the user's printing history, digital 3D printing files, available funds, and pending 3D printing requests.

17. A printer management system comprising:
a management server capable of being communicatively coupled to one or more 3D printing devices over a communications network,
wherein, the management server is configured to
receive, over the communications network, a print request from one or more user devices or the one or more 3D printing devices to print a digital file,
transmit, over the communications network, the digital file to a selected one or more 3D printing devices, and
transmit, over the communications network, commands to lock and unlock a locking mechanism of the one or more 3D printing devices, the locking mechanism configured to secure a moveable panel, which is adapted to cover an opening through which a user may access a 3-dimensional printing region of the 3D printing device for printing the digital file when the moveable panel is in a closed position, in the closed position thereby preventing the user from accessing the printing region through the opening.

18. The printer management system of claim 17, wherein the management server transmits the command to lock the locking mechanism of the selected one or more 3D printing devices prior to printing of the digital file, and transmits the command to unlock the locking mechanism of the selected one or more 3D printing devices at a time after the digital file has completed printing.

19. The printer management system of claim 17, wherein the management server is further configured to update a printing status of each of the one or more 3D printing devices.

20. The printer management system of claim 19, wherein the printing status indicates printer operation time, printer occupation time, or printer material remaining.

21. The printer management system of claim 17, wherein the management server is further configured to store the digital files received from the one or more user devices.

22. The printer management system of claim 17, wherein the print request comprises the metadata for the digital file.

23. The printer management system of claim 22, wherein the metadata comprises at least one of a file name of the digital file, an owner of the digital file, an estimated time to print the digital file, and an estimated amount of material required to print the digital file.

24. The printer management system of claim 17, wherein the management server comprises:
a user account subsystem configured to store or access individual user account information; and
a security subsystem in communication with the user account subsystem and configured to store or access user authentication information associated with the individual user account information,
wherein the security subsystem is further configured to receive and verify user authentication information from a user and (i) grant access to the associated individual user account information if the user's authentication information is verified, and (ii) deny access to individual user account information if not.

25. The printer management system of claim 24, wherein the security subsystem is further configured to
store or access administrator authentication information,
receive and verify administrator authentication information from an administrator and (i) grant access to individual user account information if the administrator's authentication information is verified, and (ii) deny access to individual user account information if not.

26. The printer management system of claim 25, wherein the management server further comprises a 3D printing device subsystem in communication with the security subsystem and is configured to
retrieve and update a printing status of each of the one or more 3D printing devices, and
provide the printing status to verified users and administrators.

27. The printer management system of claim 24, wherein the individual user account information comprises at least one of the user's printing history, digital 3D printing files, available funds, and pending 3D printing requests.

28. The printer management system of claim 24, wherein the user authentication information comprises at least one of a password, pin number, card number, biometric data, and RFID tag.

29. A 3D printing device comprising:
a 3-dimensional printing region for printing a digital file;
an opening through which a user may access the printing region;
a moveable panel adapted to cover the opening when disposed in a closed position; and
a locking mechanism configured to lock the moveable panel in the closed position thereby preventing the user from accessing the printing region through the opening,
wherein
the 3D printing device is capable of being communicatively coupled to a management server, and
the 3D printing device is configured to lock the locking mechanism during printing of the digital file, and is capable of unlocking the locking mechanism upon receiving a command from an authorized user and from the management server.

30. The 3D printing device of claim 29, wherein the locking mechanism comprises an electromagnetic lock.

31. The 3D printing device of claim 29, wherein the locking mechanism comprises a mechanical bolt-action lock.

32. The 3D printing device of claim 29, further comprising:
a user interface,
wherein the user interface is configured to
authenticate an authorized user, and
unlock the locking mechanism in response to an unlock command from the authorized user.

* * * * *